United States Patent
Ikai et al.

(10) Patent No.: US 12,513,341 B2
(45) Date of Patent: Dec. 30, 2025

(54) 3D VIDEO DECODING APPARATUS AND 3D VIDEO CODING APPARATUS

(71) Applicant: SHARP KABUSHIKI KAISHA, Osaka (JP)

(72) Inventors: Tomohiro Ikai, Sakai (JP); Sachin G. Deshpande, Vancouver, WA (US); Tomoko Aono, Osaka (JP); Keiichiro Takada, Osaka (JP); Takeshi Chujoh, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 24 days.

(21) Appl. No.: 18/428,741

(22) Filed: Jan. 31, 2024

(65) Prior Publication Data
US 2024/0380926 A1    Nov. 14, 2024

Related U.S. Application Data

(60) Provisional application No. 63/465,833, filed on May 11, 2023.

(51) Int. Cl.
| | |
|---|---|
| *H04N 19/80* | (2014.01) |
| *H04N 19/132* | (2014.01) |
| *H04N 19/136* | (2014.01) |
| *H04N 19/172* | (2014.01) |
| *H04N 19/174* | (2014.01) |
| *H04N 19/42* | (2014.01) |
| *H04N 19/70* | (2014.01) |
| *H04N 19/85* | (2014.01) |

(52) U.S. Cl.
CPC ........... *H04N 19/80* (2014.11); *H04N 19/132* (2014.11); *H04N 19/136* (2014.11); *H04N 19/172* (2014.11); *H04N 19/174* (2014.11); *H04N 19/42* (2014.11); *H04N 19/70* (2014.11); *H04N 19/85* (2014.11)

(58) Field of Classification Search
CPC ....................................................... H04N 19/70
See application file for complete search history.

(56) References Cited

U.S. PATENT DOCUMENTS

| | | | | |
|---|---|---|---|---|
| 2023/0419557 | A1* | 12/2023 | Yoon ...................... | H04N 19/70 |
| 2024/0244268 | A1* | 7/2024 | Deshpande .......... | H04N 19/172 |

OTHER PUBLICATIONS

Ye-Kui Wang et al., "BoG report on NNPE and SEI processing order SEI messages", JVET-AD0362-v4, Joint Video Experts Team(JVET) of ITU-T SG 16 WP 3 and ISO/IEC JTC 1/SC 29, 30th Meeting, Antalya, TR, Apr. 21-28, 2023.

"Information technology—Coding-independent code points—Part 2: Video", Date: Nov. 5, 2022, Text of ISO/IEC DIS 23091-2:202x (3rd Ed.), Secretariat: JISC.

(Continued)

*Primary Examiner* — Jerry T Jean Baptiste
(74) *Attorney, Agent, or Firm* — ScienBiziP, P.C.

(57) ABSTRACT

A device may comprise one or more processors configured to: derive variables BitDepthY and BitDepthC equal to BitDepthY and BitDepthC; decode a slice QP SliceQPY and a offset QpBdOffsetY; derive StrengthControlVal equal to a value of (SliceQpY+QpBdOffsetY)÷(51+QpBdOffsetY) of a first slice of current coded picture; and set StrengthControlVal to an input tensor.

3 Claims, 10 Drawing Sheets

(56) References Cited

OTHER PUBLICATIONS

"Information technology—Multimedia content description interface—Part 17: Compression of neural networks for multimedia content description and analysis (2nd edition)", Publication date: Aug. 2022, ISO/IEC 15938-17:xxxx(E), ISO JTC 1/SC 29/WG 11, Secretariat: JISC.

"Information technology—MPEG video technologies—Part 7: Versatile supplemental enhancement information messages for coded video bitstreams, Amendment 1: Additional SEI messages", Date: Nov. 10, 2022, ISO/IEC JTC 1/ SC 29 /WG 5 N 158, Text of ISO/IEC 23002-7:2022/DAM 1, Secretariat: JISC.

"Series H: Audiovisual and Multimedia Systems Infrastructure of audiovisual services—Coding of moving video", ITU-T, Telecommunication Standardization Sector of ITU, H.274, (May 2022).

"Information technology—Coded representation of immersive media—Part 29: Video-based dynamic mesh coding (V-DMC)", Iso 23090-29:2023(E), ISO/IEC JTC 1/SC 29/WG 7, Date: Feb. 10, 2023.

"Information technology—Coded representation of immersive media—Part 12: MPEG Immersive video", Publication date : Aug. 2023, ISO/IEC 23090-12:2021(E)/AMD.1:2022, ISO/IEC JTC 1/SC 29, Secretariat: JISC.

"Information technology—Coded representation of immersive media—Part 5: Visual volumetric video-based coding (V3C) and video-based point cloud compression (V-PCC)", ISO/IEC 23090-5:2023(E), ISO/IEC JTC 1/SC 29/WG 07, Date: Feb. 1, 2023, Secretariat: AFNOR (France).

Gaëlle Martin-Cocher (InterDigital), "on V3C Reconstruction profiles and SEI messages", ISO/IEC JTC 1/SC 29/WG 7 m 63263, Antalya, Turkey—Apr. 2023.

Sean McCarthy et al., "Improvements under consideration for neural network post filter SEI messages", Document: JVET-AC2032-v2, Joint Video Experts Team (JVET), of ITU-T SG 16 WP 3 and ISO/IEC JTC 1/SC 29, 29th Meeting, by teleconference, Jan. 11-20, 2023.

* cited by examiner

| nn_post_filter_characteristics( payloadSize ) { | Descriptor |
|---|---|
|   nnpfc_purpose | u(16) |
|   nnpfc_id | ue(v) |
|   nnpfc_mode_idc | ue(v) |
|   if( nnpfc_mode_idc == 1 ) { | |
|     ….. | |
|   } | |
|   nnpfc_property_present_flag | u(1) |
|   if( nnpfc_property_present_flag ) { | |
|     ….. | u(1) |
|     if( chromaUpsamplingFlag ) | |
|       nnpfc_out_sub_c_flag | u(1) |
|     if( colourizationFlag ) | |
|       nnpfc_out_colour_format_idc | u(2) |
|     if( resolutionResamplingFlag ) { | |
|       nnpfc_pic_width_num_minus1 | ue(v) |
|       nnpfc_pic_width_denom_minus1 | ue(v) |
|       nnpfc_pic_height_num_minus1 | ue(v) |
|       nnpfc_pic_height_denom_minus1 | ue(v) |
|     } | |
|   ….. | |
|   nnpfc_component_last_flag | u(1) |
|   nnpfc_inp_format_idc | ue(v) |
|   if( nnpfc_inp_format_idc == 1 ) | |
|     nnpfc_inp_tensor_luma_bitdepth | ue(v) |
|   nnpfc_inp_order_idc | ue(v) |
|   nnpfc_auxiliary_inp_idc | ue(v) |
|   …….. | |
|   nnpfc_out_format_idc | ue(v) |
|   …….. | |
|   nnpfc_out_order_idc | ue(v) |
|   nnpfc_overlap | ue(v) |
|   nnpfc_constant_patch_size_flag | u(1) |
|   if( nnpfc_constant_patch_size_flag ) { | |
|     nnpfc_patch_width_minus1 | ue(v) |
|     nnpfc_patch_height_minus1 | ue(v) |
|   …….. | |
|   } | |
|   /* ISO/IEC 15938-17 bitstream */ | |
|   if( nnpfc_mode_idc == 0 ) { | |
|     while( !byte_aligned( ) ) | |
|       nnpfc_reserved_zero_bit_b | u(1) |
|     for( i = 0; more_data_in_payload( ); i++ ) | |
|       nnpfc_payload_byte[ i ] | b(8) |
|   } | |
| } | |

FIG.6

| nn_post_filter_activation( payloadSize ) { | Descriptor |
|---|---|
|     nnpfa_target_id | ue(v) |
|     nnpfa_cancel_flag | u(1) |
|     if (nnpfa_cancel_flag != 0) | |
|         nnpfa_persistence_flag | u(1) |
| } | |

FIG.7

| nn_post_filter_information( payloadSize ) { | Descriptor |
|---|---|
|   nnpfi_type | u(4) |
|   nnpfi_cancel_flag | u(1) |
|   if (nnpfi_cancel_flag != 0) { | |
|     nnpfi_persistency_flag | u(1) |
|     nnpfi_map_count_minus1 | u(4) |
|     nnpfi_attribute_count | u(7) |
|     nnpfi_occupancy_enabled_flag | u(1) |
|     if (nnpfi_occupancy_enabled_flag) | |
|       nnpfi_occupancy_process_idc | u(16) |
|     for( j = 0; j < nnpfi_map_count_minus1+1; j++ ) { | |
|       nnpfi_geometry_enabled_flag[ j ] | u(1) |
|       if (nnpfi_geometry_enabled_flag[ j ]) | |
|       nnpfi_geometry_process_idc [ j ] | u(16) |
|     } | |
|     for( i = 0; i < nnpfa_attribute_count; i++ ) { | |
|       for( j = 0; j < nnpfa_map_count_minus1+1; j++ ) { | |
|         nnpfi_attribute_enabled_flag[ i ][ j ] | u(1) |
|         if (nnpfi_attribute_enabled_flag[ i ][ j ]) | |
|         nnpfi_attribute_process_idc [ i ][ j ] | u(16) |
|       } | |
|     } | |
|   } | |
| } | |

FIG.8

| | Descriptor |
|---|---|
| nn_post_filter_information( payloadSize ) { | |
|   nnpfi_type | u(4) |
|   nnpfi_cancel_flag | u(1) |
|   if (nnpfi_cancel_flag != 0) { | |
|     nnpfi_persistency_flag | u(1) |
|     nnpfi_map_count_minus1 | u(4) |
|     nnpfi_attribute_count | u(7) |
|     nnpfi_occupancy_enabled_flag | u(1) |
|     if (nnpfi_occupancy_enabled_flag) { | |
|       nnpfi_occupancy_model_idc | u(4) |
|       nnpfi_occupancy_process_idc | u(16) |
|       nnpfi_occupancy_complexity_info_present_flag | u(1) |
|       if (nnpfi_occupancy_complexity_info_present_flag) | |
|         nnpfi_complexity_info(0, 0, 0) | |
|     } | |
|     for( j = 0; j < nnpfi_map_count_minus1+1; j++ ) { | |
|       nnpfi_geometry_enabled_flag[ j ] | u(1) |
|       if (nnpfi_geometry_enabled_flag[ j ]) { | |
|         nnpfi_geometry_model_idc [ j ] | u(4) |
|         nnpfi_geometry_process_idc [ j ] | u(16) |
|         nnpfi_geometry_complexity_info_present_flag [ j ] | u(1) |
|         if (nnpfi_geometry_complexity_info_present_flag [ j ] ) | |
|           nnpfi_comprexity_info(1, 0, j) | |
|       } | |
|     } | |
|     for( i = 0; i < nnpfa_attribute_count; i++ ) { | |
|       for( j = 0; j < nnpfa_map_count_minus1+1; j++ ) { | |
|         nnpfi_attribute_enabled_flag[ i ][ j ] | u(4) |
|         if (nnpfi_attribute_enabled_flag[ i ][ j ]) { | |
|           nnpfi_attribute_model_idc [ i ][ j ] | u(16) |
|           nnpfi_attribute_process_idc [ i ][ j ] | u(16) |
|           nnpfi_attribute_complexity_info_present_flag [ i ][ j ] | u(1) |
|           if (nnpfi_geometry_complexity_info_present_flag [i][j] ) | |
|             nnpfi_complexity_info(2, i, j) | |
|         } | |
|       } | |
|     } | |
|   } | |
| } | |

FIG.9

3D VIDEO DECODING APPARATUS AND 3D VIDEO CODING APPARATUS

RELATED APPLICATIONS

This application claims the benefit of U.S. Provisional Application No. 63/465,833, filed on May 11, 2023, which is hereby incorporated by reference in its entirety.

TECHNICAL FIELD

The embodiments of the present invention relate to a 3D video decoding apparatus and a 3D video coding apparatus.

BACKGROUND ART

A video coding apparatus which generates coded data by coding (encoding) a video, and a video decoding apparatus which generates decoded video by decoding the coded data are used for efficient transmission or recording of videos. There's video coding schemes (video codec) include H.264/AVC, High-Efficiency Video Coding (HEVC), and Versatile Video Coding (VVC), and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU. In addition, there is a neural network post-filter technique for filtering 2D video using supplementary enhancement information (SEI).

In order to transmit or record 3D data efficiently, there are 3D data encoding devices that convert 3D data into 2D images and encode them using a video coding scheme to generate a coded data, and 3D data decoding devices that decode 2D images from said the coded data, reconstruct them, and generate 3D data.

Specific 3D data coding schemes include, for example, 'ISO/IEC 23090-5 V3C (Visual Volumetric Video-based Coding) and V-PCC (Video-based Point Cloud Compression). V3C is a 3D data coding method that uses a video codec as the basis of a 3D image, V3C is used for encoding and decoding point clouds, which consist of point position and attribute information. In addition, ISO/IEC 23090-12 (MPEG Immersive Video, MIV) and ISO/IEC 23090-29 (Video-based Dynamic Mesh Coding, V-DMC), which is currently being standardized, are used for coding and decoding multi-view video and mesh video. Non-Patent Document 1 (VSEI) is disclosed for applying the neural network post filter on the coded video stream. Non-Patent Document 2 discloses referencing VSEI specification on V3C applications.

CITATION LIST

Non Patent Literature

NPL 1: Sean McCarthy, Sachin Deshpande, Miska M. Hannuksela, Hendry, Gary J. Sullivan, Ye-Kui Wang, "Improvements under consideration for neural network post filter SEI messages," JVET-AC2032, January 2023.

NPL 2: G. Martin-Cocher, "V3C-on SEI messages and Rec profiles," ISO/IEC JTC1 SC29 WG7, m63263, April 2023.

SUMMARY OF INVENTION

Technical Problem

The NPL1 method applies the neural network post filter (NNPF) on coded video steam and NPL2 shows apply the NNPF on V3C application. However on applying the NNPF on V3C occupancy video stream, geometry video stream and attribute video stream, all of them lack sufficient procedure or restriction to guarantee an interoperability between various encoder devices, decoder device and bitstreams.

Solution to Problem

This invention aims to provide neural network post filter process on the V3C occupancy video stream, geometry video stream and attribute video stream to achieve an interoperability.

Advantageous Effects of Invention

According to an aspect of the present invention, the quality of the occupancy video stream, geometry video stream and attribute video stream can be improved while achieving a conformance.

BRIEF DESCRIPTION OF DRAWINGS

FIG. 6: Syntax table of neural network post filter characterises SEI

FIG. 7: Syntax table of neural network post filter activation SEI

FIG. 8: syntax table of V3C neural network post filter information SEI

FIG. 9: syntax table of V3C neural network post filter information SEI

DESCRIPTION OF EMBODIMENTS

First Embodiment

Hereinafter, embodiments of the present disclosure will be described with reference to the drawings.

The following is a description of the embodiment of the present invention with reference to the drawings.

Figure 1:
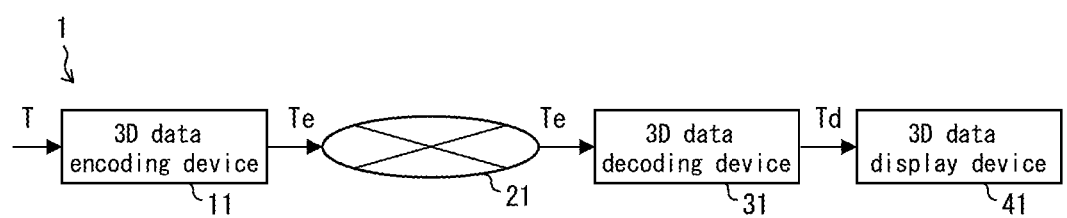
FIG. 1: The diagram of the 3D data transmission system.

FIG. 1 is a schematic diagram of the 3D data transmission system 1. The 3D data transmission system 1 is a system that encodes a 3D data into a coded stream, transmits the coded stream, decodes the transmitted coded stream, and displays the 3D data. The 3D data transmission system 1 comprises a 3D data encoding device 11, a network 21, a 3D data decoding device 31, and a 3D data display device 41. The 3D data Tis input to the 3D data encoding device 11. Network 21 transmits the coded stream Te generated by the 3D data encoding device 11 to the 3D data decoding device 31. Network 21 is the Internet (Internet), a wide area network (WAN: Wide Area Network), a small network (LAN: Local Area Network), or a combination of these. Network 21 is not necessarily a bidirectional communication network, but can also be a unidirectional communication network that transmits broadcast waves such as terrestrial digital broadcasting and satellite broadcasting. The network 21 may also be substituted by a storage medium that records coded streams Te such as DVD (Digital Versatile Disc: registered trademark) and BD (Blu-ray Disc: registered trademark).

The 3D data (3D information) herein is a set of position (x, y, z) and attribute (e.g. r, g, b) information in 3D space. For example, 3D data is expressed in the form of a point cloud, which is a set of points of position and attribute information in 3D space, or a set of mesh (or polygon) consisting of triangular vertices and faces where vertices includes a set of position (x, y, z) and faces has attribute image, which can be represented with UV Atlas method.

The 3D data decoding device 31 decodes each of the coded streams Te transmitted by the network 21 and generates one or more decoded 3D data Td.

The 3D data display device 41 displays all or part of the one or more decoded 3D data Td generated by the 3D data decoding device 31. 3D data display device 41 is equipped with a display device, such as a liquid crystal display, organic EL (electro-luminescence) display, etc. The form of the display can be stationary, mobile, HMD, etc. If the 3D data decoding device 31 has high processing power, it displays images with high image quality, and if it has only lower processing power, it displays images that do not require high processing and display power.

Operators

The operators used herein are listed below.

>> is right bit shift, << is left bit shift, & is bitwise AND, | is bitwise OR, |= is OR assignment operator, and || denotes logical OR.

x?y: z is a ternary operator that takes y if x is true (non-zero) and z if x is false (zero) y . . . z denotes the set of integers from y to z.

Abs(x) is a function that returns x (in the case x>=0) or −x (in the case x<0).

Floor(x) is a function that returns the largest integer less than or equal to x.

Clip3(x, y, z) is a function that returns x (in the case z<x) or y (in the case z>y) or z (otherwise).

Round (x) is a function that returns Sign(x)*Floor (Abs (x)+0.5)

Structure of the Coded Stream Te

The data structure of the coded stream Te generated by the 3D data encoding device 11 and decoded by the 3D data decoding device 31 is described below.

Figure 2:
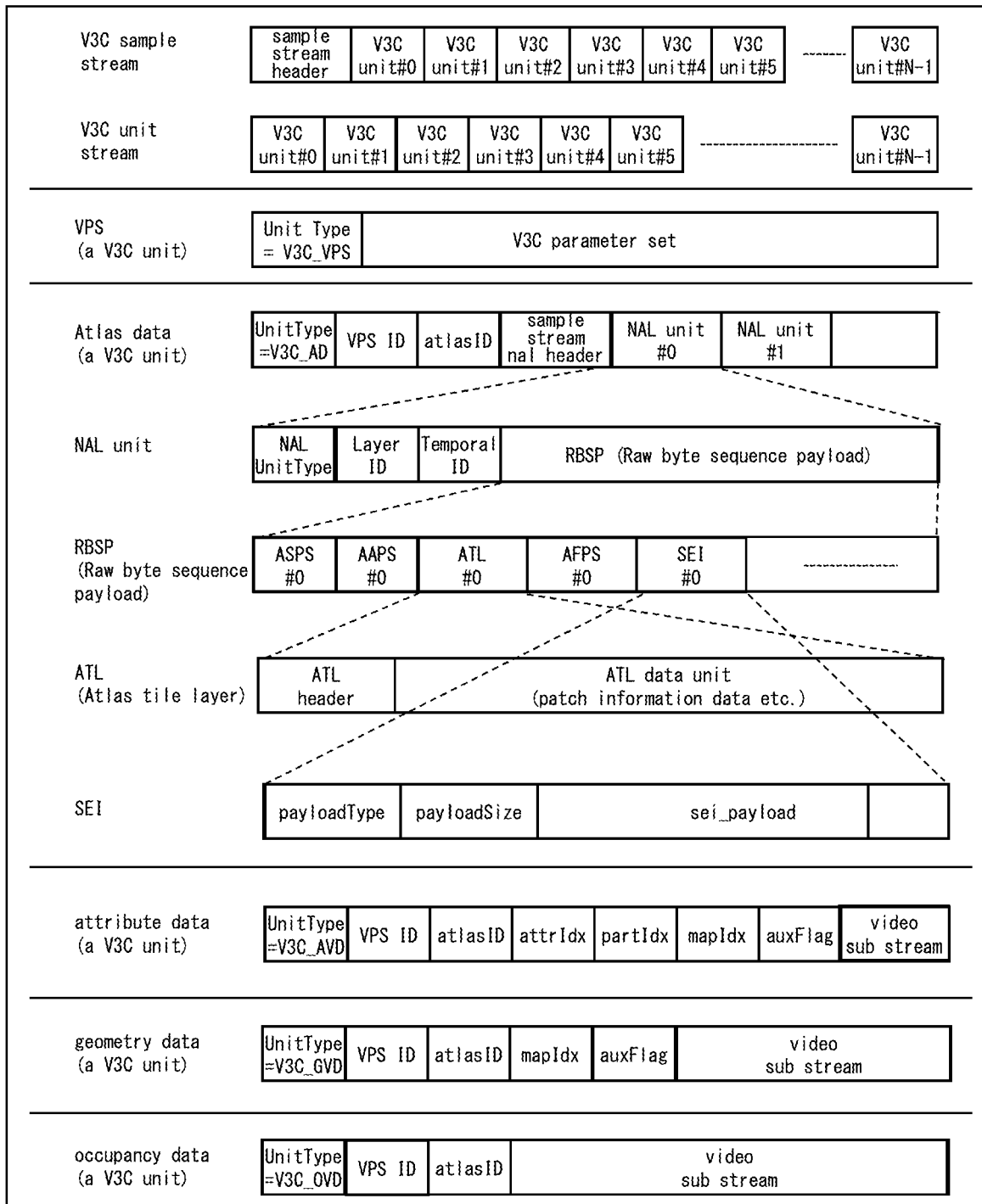
FIG. 2: The hierarchical structure of the data in the coded stream.

FIG. 2 shows the hierarchical structure of data in the coding stream Te. The coded stream Te has a data structure of either V3C sample stream or V3C unit stream. V3C sample stream includes sample stream header and V3C unit, while V3C unit stream includes V3C unit.

A V3C unit contains a V3C unit header and a V3C unit payload. The V3C unit header has Unit Type which can be either V3C_VPS, V3C_AD, V3C_AVD, V3C_GVD, V3C_OVD, etc. The V3C unit payload with the specific Unit Type is also called as V3C_VPS, V3C_AD, V3C_AVD, V3C_GVD, V3C_OVD.

If Unit Type is V3C_VPS (Video Parameter Set), the V3C unit payload contains a V3C parameter set.

If Unit Type is V3C_AD (Atlas Data), V3C unit payload includes VPS ID, atlasID, sample stream nal header and multiple NAL units. ID stands for Identification and is an integer value greater than or equal to 0. The atlasID may be used as an element of the applicable SEI.

The NAL unit contains the NALUnitType, layerID, temporalID, and RBSP (Raw byte sequence payload).

The NAL unit is identified by NALUnitType and includes ASPS (Atlas Sequence Parameter Set), AAPS (Atlas Adaptation Parameter Set), ATL (Atlas Tile layer), AFPS (Atlas Frame Parameter Set), SEI (Supplemental Enhancement Information).

ATL includes an ATL header and an ATL data unit. The ATL data unit contains information such as the position and size of the patch, including patch information data.

SEI includes payloadType, which indicates the type of SEI, payloadSize, which indicates the size (in bytes) of SEI, and sei_payload of SEI data.

If the UnitType is V3C_AVD (Attribute Video Data, attribute data), the VPS ID, atlasID, attrIdx (ID of attribute image), partIdx (partition ID), mapIdx (map ID), auxFlag and video sub-bitstream (attribute video stream, attribute sub-bitstream). auxFlag indicates whether the data is auxiliary data or not. The video sub-bitstream is video data, coded with AVC, HEVC, VVC, etc.

If UnitType is V3C_GVD (Geometry Video Data, geometry data), it includes VPS ID, atlasID, mapIdx, auxFlag, and video sub-bitstream (geometry video stream, geometry sub-bitstream). mapIdx indicates which particular depth is used for projection.

If UnitType is V3C_OVD (Occupancy Video Data, occupancy data), it includes VPS ID, atlasID, and video sub-bitstream (occupancy video stream, occupancy sub-bitstream).

Figure 3:
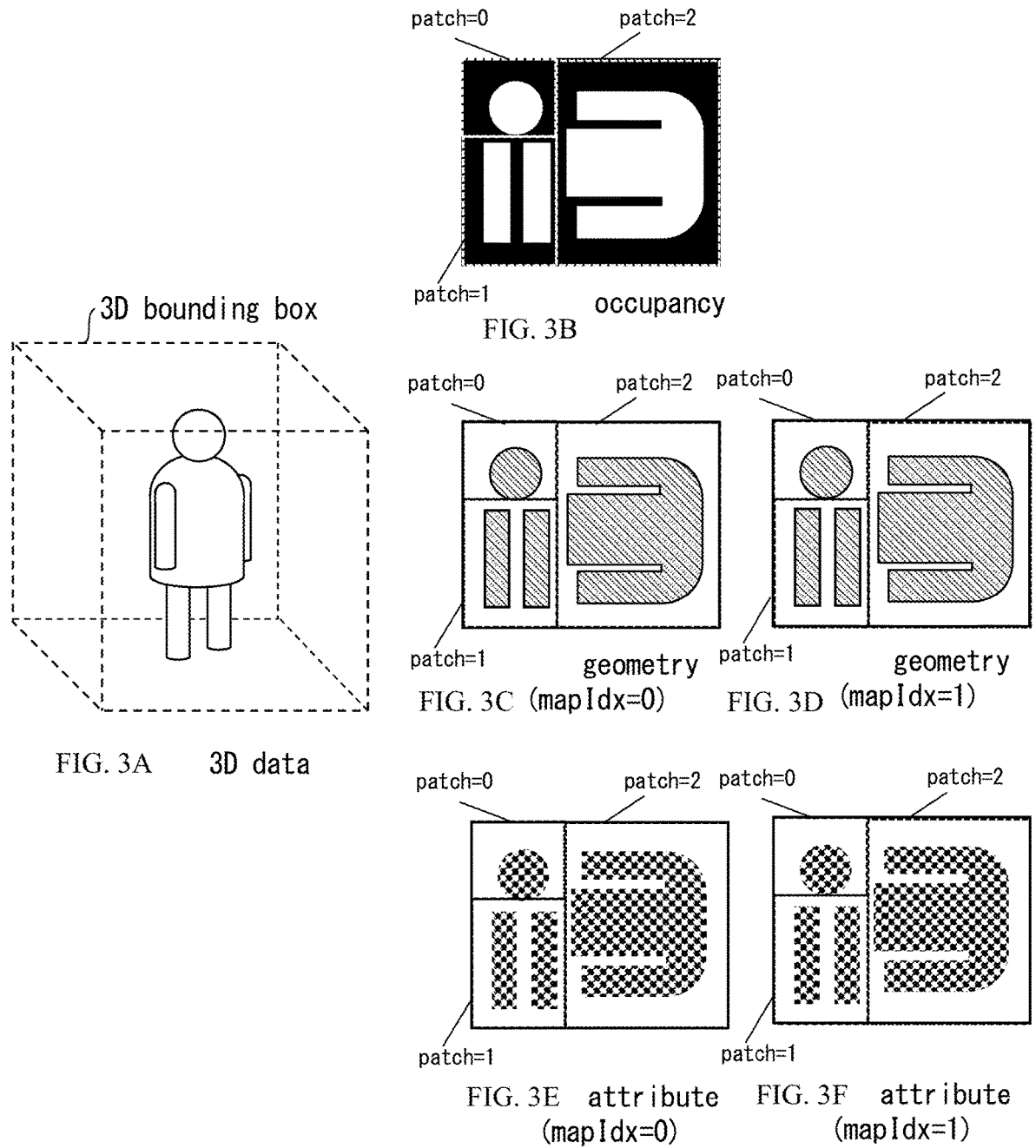
FIGS. 3A to 3F: 3D data, occupancy frame, geometry frame, and attribute frame.

FIGS. 3A to 3F illustrate the 3D data, occupancy frame (2D image representing occupancy information), geometry frame (2D image representing depth or position information), and attribute frame (2D image representing attribute information). The point cloud and mesh that make up the 3D data are divided into multiple portions (regions) by the 3D data encoding device 11, and the point cloud contained in each portion is represented in the form of a 3D bounding box. The 3D data encoding device 11 generates multiple patches from the projected point clouds, including information about the 3D bounding box (coordinates, size, etc.) and information about the mapping to the projection plane (projection plane of each patch, including coordinates, size, and rotation), coordinates, size, rotation, etc.) is called atlas information. The occupancy frame is a 2D binary frame/image (e.g., 1 for valid area and 0 for invalid area) showing the valid area (area where a valid point exists) in each patch (FIG. 3B). Values other than 0 and 1, such as 255 and 0, may be used for valid and invalid area. A geometry frame is a 2D image which shows the depth value (distance) of each patch to the projection plane (FIG. 3C and FIG. 3D). The relationship between depth value and pixel value may be linear, or the distance may be derived from the pixel value by a look-up table, a mathematical formula, or a relational expression based on a combination of branches by value. An attribute frame is 2D image representing the attributes (e.g., RGB colors) of points (FIG. 3E and FIG. 3F). The same direction projection may have different depth for object surfaces, e.g. far surface and near surface. mapIdx indicates which particular depth is used for projection. geometry and attribute can be projected to multiple of different particular depth. In FIG. 3, two map cases are shown for geometry frames and attribute frames.

These occupancy frame, geometry frame, attribute frame, and atlas information may contain (packed) partial images (patches) from different projection planes onto a certain 2D image. In FIG. 3. 3 patches, patch0, patch1 and patch2 is included in the occupancy frame, geometry frame, attribute frame. Atlas information includes information on the number of patches and the projection planes corresponding to the patches. 3D data decoding devices 31 reconstructs the coordinates and attribute information of a point cloud or mesh from the atlas information, occupancy frame, geometry frame, and attribute frame. Here, a point is each point in a point cloud or a vertex of the mesh. The mesh information may be divided into the base mesh, which is a subset of the mesh and constitutes the basic mesh, and the mesh displacement, which indicates the displacement from the base mesh, to indicate meshes other than the basic mesh, and then encoded, decoded, and transmitted.

Figure 4:
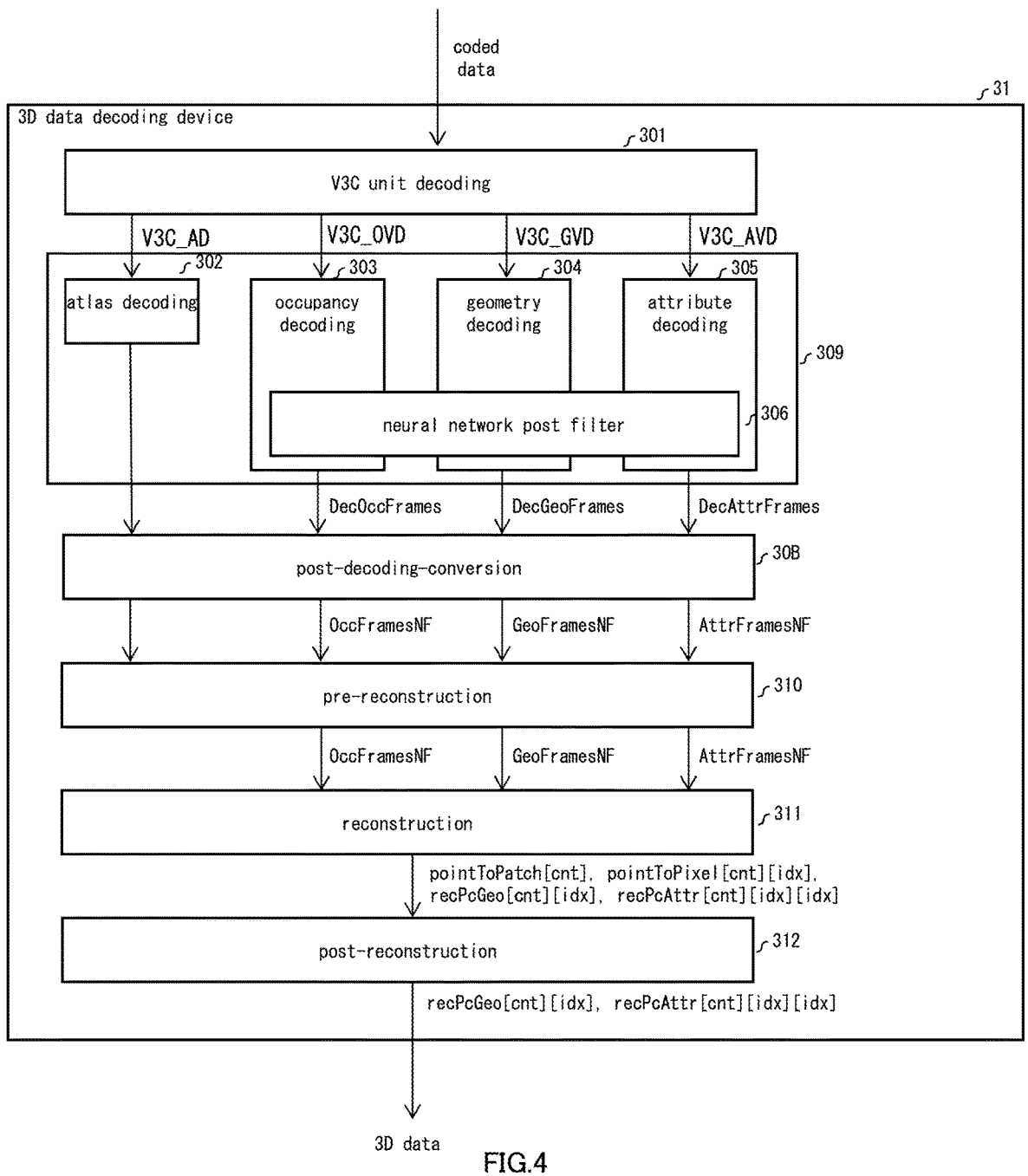
FIG. 4: The 3D data decoding device 31 for an embodiment of the present invention.
Figure 5:
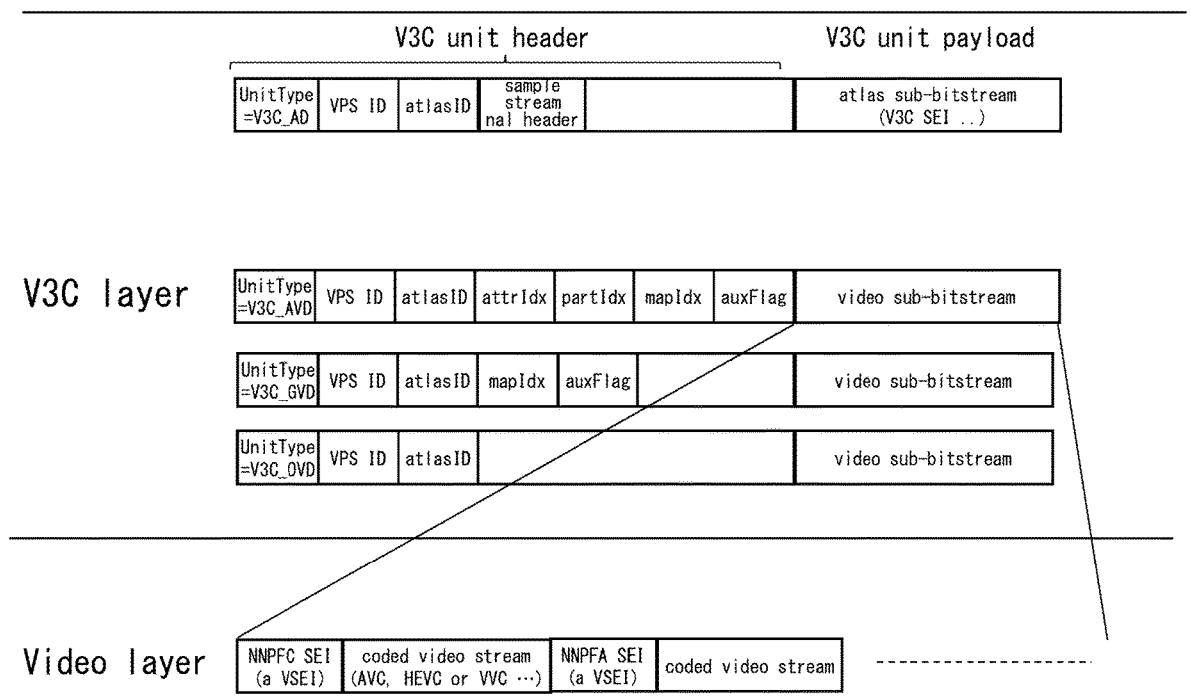
FIG. 5: Relationship of V3C layer and video layer
Figure 10:
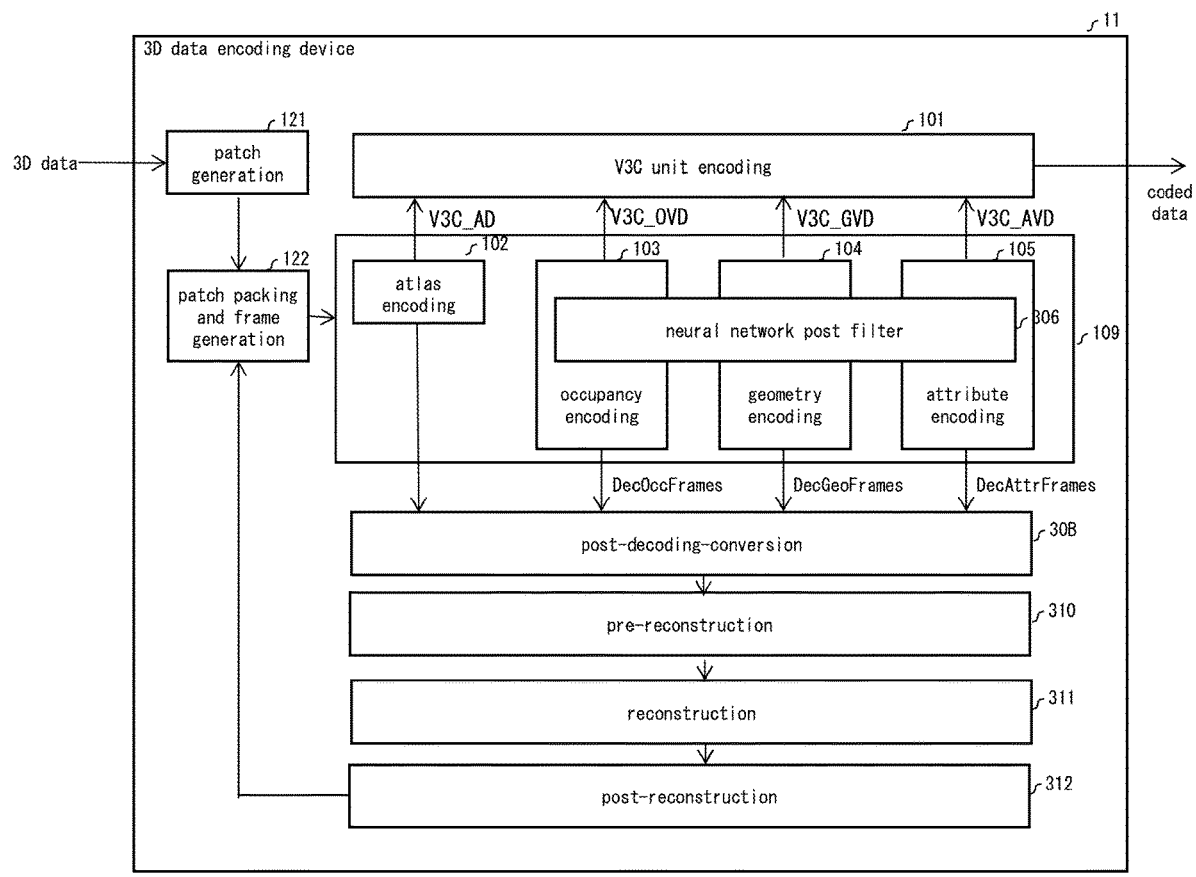
FIG. 10: The 3D data encoding device 11 for an embodiment of the present invention.

FIG. 5 shows relationship between V3C layer and video layer. The 3D data decoding device 31 decodes V3C units specified in V3C layer. As shown FIG. 2, V3C units consists of V3C unit header and V3C unit payload. The V3C unit payload may consist of atlas sub-bitsteam or video sub-bitstream. video_sub_bitstream (numBytes) contains a portion of a video unit stream (e.g. AVC, HEVC or VVC etc) of size numBytes as an ordered stream of bytes or bits within which the locations of unit boundaries are identifiable from patterns in the data. The codec of such video sub-bitstream is identified by a codec group or a four-character code (4CC code) specified by ptl_profile_codec_group_idc syntax element in VPS or ccm_codec_4cc syntax element in a component codec mapping (ccm) SEI message. The 4CC code may be either 'avc3', 'hev1', 'hev1', 'vvi1' or provided by the ccm SEI, avs3, hev1, vvi1 indicates AVC, HEVC, VVC respectively. ptl_profile_codec_group_idc indicates the codec group profile component. Component codec mapping SEI message informs the V3C decoder of the codec mapping for the codec ids of the component sub-bitstreams signalled in the VPS. The video sub-bitstream is decoded by sub-bitstream decoding section 309 in FIG. 4 (occupancy decoding section 303, geometry decoding section 304, attribute decoding section 305). The syntax, semantics and decoding process of video sub-bitstream is specified in other specification. The video sub-bitstream can be considered and processed in the different layer (lower layer) from the V3C layer, here called video layer.

Hereafter the following terms are used.

atlas: collection of 2D bounding boxes and their associated information placed onto a rectangular frame and corresponding to a volume in 3D space on which volumetric data is rendered.

attribute: scalar or vector property optionally associated with each point in a volumetric frame such as colour, reflectance, surface normal, transparency, material ID, etc.

attribute frame: 2D rectangular array created through the aggregation of patches containing values of a specific attribute.

attribute frame: 2D rectangular array created through the aggregation of patches containing values of a specific attribute.

attribute map: attribute frame containing attribute patch information projected at a particular depth indicated by the corresponding geometry map.

bitstream: ordered series of bits that forms the coded representation of the data coded atlas sequence (CAS): sequence of coded atlas access units, in decoding order, of an IRAP coded atlas access unit with NoOutputBeforeRecoveryFlag equal to 1, followed by zero or more coded atlas access units that are not IRAP coded atlas access units with NoOutputBeforeRecoveryFlag equal to 1, including all subsequent access units up to but not including any subsequent coded atlas access unit that is an IRAP coded atlas access unit with NoOutputBeforeRecoveryFlag equal to 1.

geometry: set of Cartesian coordinates associated with a volumetric frame.

geometry frame: 2D array created through the aggregation of the geometry information associated with each patch.

geometry map: geometry frame containing geometry patch information projected at a particular depth occupancy: values that indicate whether atlas samples correspond to associated samples in 3D space.

occupancy frame: collection of occupancy values that constitute a 2D array and represents the entire occupancy information of a single atlas frame.

patch: rectangular region within an atlas associated with volumetric information Configuration of 3D Data Decoding Device FIG. 4 is a functional block diagram showing the schematic configuration of the 3D data decoding device 31.

The 3D data decoding device 31 consists of a V3C unit decoding section 301, atlas decoding section 302, occupancy decoding section 303, geometry decoding section 304, attribute decoding section 305, neural network post filter section 306, post-decoding-conversion section 30B, pre-reconstruction section 310, reconstruction section 311 and post-reconstruction section 312. The sections which consists of atlas decoding section 302, occupancy decoding section 303, geometry decoding section 304, attribute decoding section 305, neural network post filter section 306 can be processed in a one section, this is called as sub-bitstream decoding section 309.

V3C unit decoding section 301 receives coded data (bit stream) in byte stream format, ISO Base Media File Format (ISOBMFF), etc., and decodes V3C unit header and V3C VPS. V3C unit decoding section 301 uses atlas decoding section 302, occupancy decoding section 303, geometry decoding section 304, attribute decoding section 305 depending on UnitType in the V3C unit header. When the UnitType is V3C_AD, atlas decoding section 302 is used, and likewise, when the UnitType is V3C_OVD, V3C_GVD, V3C_AVD, occupancy decoding section 303, geometry decoding section 304, attribute decoding section 305 is used to decode occupancy video stream, geometry video stream and attribute video stream respectively.

FIG. 11 is a functional block diagram showing the schematic configuration of the 3D data encoding device 11. The 3D data encoding device 11 consists of patch generation section 121, patch packing and frame generation section 122, a V3C unit encoding section 101, atlas encoding section 102, occupancy encoding section 103, geometry encoding section 104, attribute encoding section 105, neural network post filter section 306, post-decoding-conversion section 30B, pre-reconstruction section 310, reconstruction section 311 and post-reconstruction section 312. The sections which consists of atlas decoding section 302, occupancy decoding section 303, geometry decoding section 304, attribute decoding section 305, neural network post filter section 306 can be processed in a one section, this is called as sub-bitstream encoding section 109. The patch generation section 121 receives the 3D data and projected it to generate a set of patch. The patch packing and frame generation section 122 merges (packs) a set of patch in time series and generate occupancy frames, geometry frames and attribute frames. The occupancy encoding section 103, geometry encoding section 104, attribute encoding section 105 encodes the generated occupancy frames geometry frames and attribute frames by using a video codec into each video sub-bitstream. The atlas encoding section 102 encode patch information. The V3C unit encoding section 101 encodes the encoded video sub-bitstreams and atlas information as a V3C coded data.

The atlas decoding section 302 receives the atlas information coded stream and decodes the atlas information.

The occupancy decoding section 303 decodes the occupancy video stream encoded with VVC, HEVC, etc., and outputs the decoded occupancy frames, DecOccFrames [frameIdx] [compIdx] [y] [x]. Where DecOccFrames, frameIdx, compIdx, y and x are decoded occupancy video frames, frame index, the component index, the row index, and the column index, respectively. DecOccBitDepth, DecOccHeight, DecOccWidth, DecOccChromaFormat is denoted as the occupancy video bit depth, the occupancy video height, the occupancy video width and the occupancy chroma format.

The geometry decoding section 304 decodes the geometry video stream encoded with VVC, HEVC, etc., and and outputs the decoded frames, geometry DecGeoFrames [frameIdx] [mapIdx] [compIdx] [y] [x]. Where DecGeoFrames, frameIdx, mapIdx, compIdx, y and x are decoded geoupancy video frames, map index, frame index, the component index, the row index, and the column index, respectively. DecGeoBitDepth, DecGeoHeight, DecGeoWidth, DecGeoChromaFormat is denoted as the geometry video bit depth, the geometry video height, the geometry video width and the geometry chroma format. The decoded geometry frames may contain multiple set of geometry map (geometory frame with different depth projection) where mapIdx is used to distinguish map.

The attribute decoding section 304 decodes the attribute video stream encoded with VVC, HEVC, etc., and and attribute frames, outputs the decoded DecAttrFrames [attrIdx] [partIdx] [mapIdx] [frameIdx] [compIdx] [y] [x]. Where DecAttrFrames, frameIdx, attrIdx, partIdx, mapIdx, compIdx, y and x are decoded attrupancy video frames, frame index, attribute index, part index, map index, the component index, the row index, and the column index, respectively. DecAttrBitDepth, DecAttrHeight, DecAttrWidth, The decoded attribute frames may contain multiple set of attribute map (attribute frame with different depth projection) where mapIdx is used to distinguish map. DecAttrChromaFormat is denoted as the attribute video bit depth, the attribute video height, the attribute video width and the attribute chroma format. The decoded attributes video frames consists of multiple attributes, e.g. colour (R, G, B), reflection, alpha, normal directions. And multiple attributes can be transmitted by more than one attribute video stream, where attrIdx is used to distinguish them. E.g {R, G, B} by attribute video stream 0 (attrIdx=0), {reflection} by attribute video stream 1 (attrIdx=1), {alpha} by attribute video stream 2 (attrIdx=2). Attributes can be transmitted by spilltng partionions into multiple video streams where partIdx is used to distinguish them. mapIdx is described above.

The neural network post filter section 306 receives one or more decoded video frames, e.g. decoded occupancy video frames, decoded geometry frames and decoded attribute frames and outputs modified decoded video frames. The frame image filter section 307 may decode a neural network characteristics SEI to get neural network model inforamtions (neural network topology information and neural network parameter information) and a neural network activation SEI to specify which frames are to be applied by which neural network model is applied. The neural network post filter section 306 may be included in occupancy decoding section 303, geometry decoding section 304, attribute decoding section 305 if the neural network post filter 306 is applied for decoded occupancy video frames, decoded geometry video frames and attribute video frames respectively. Neural network post filter 306 is abbreviated as NNPF.

The post-decoding-conversion section 30B receives the decoded atlas information, the decoded occupancy frames DecOccFrames and decoded geometry frames DecGeoFrames and decoded attribute frames DecAttrFrames and transforms them at nominal format. The output is nominal format version of occupancy frames OccFrameNF and geometry frames GeoFrameNF and attribute frames AttrFrameNF.

The nominal format refers collectively to the nominal bit depth, resolution, chroma format, and composition time index that the decoded videos should be converted to.

Each video sub-bitstream and each region of packed video sub-bitstream is associated with a nominal bit depth, which is the target bit depth that all operations for reconstruction are expected to be performed in. The nominal bit depth for the occupancy component, OccBitDepthNF, is set equal to oi_occupancy_2d_bit_depth_minus1[ConvAtlasID]+1 or to pin_occupancy_2d_bit_depth_minus1[ConvAtlasID]+1, if pin_occupancy_present_flag[ConvAtlasID] equal to 1. oi_occupancy_2d_bit_depth_minus1[j] plus 1 indicates the nominal 2D bit depth to which the occupancy video for the atlas with atlas ID j shall be converted to. pin_occupancy_2d_bit_depth_minus1[j] plus 1 indicates the nominal 2D bit depth to which the decoded regions containing occupancy data for the atlas with atlas ID j shall be converted. pin_occupancy_present_flag[j] equal to 0 indicates that packed video frames of the atlas with atlas ID j do not contain regions with occupancy data. pin_occupancy_present_flag[j] equal to 1 indicates that packed video frames of the atlas with atlas ID j do contain regions with occupancy data. When pin_occupancy_present_flag[j] is not present, its value is inferred to be equal to 0. The nominal bit depth for each geometry video component, GeoBitDepthNF, is set equal to gi_geometry_2d_bit_depth_minus1[ConvAtlasID]+1 or pin_geometry_2d_bit_depth_minus1[ConvAtlasID]+1, if pin_geometry_present_flag[ConvAtlasID] equal to 1. gi_geometry_2d_bit_depth_minus1[j] plus 1 indicates the nominal 2D bit depth to which all geometry videos for the atlas with atlas ID j shall be converted to. pin_geometry_2d_bit_depth_minus1[j] plus 1 indicates the nominal 2D bit depth to which the decoded regions containing geometry data for the atlas with atlas ID j shall be converted. pin_geometry_present_flag[j] equal to 0 indicates that packed video frames of the atlas with atlas ID j do not contain regions with geometry data. pin_geometry_present_flag[j] equal to 1 indicates that packed video frames of the atlas with atlas ID j do contain regions with geometry data. When pin_geometry_present_flag[j] is not present, its value is inferred to be equal to 0. Finally, the nominal bit depth for each attribute video component with attribute index attrIdx, AttrBitDepthNF [attrIdx], is set equal to ai_attribute_2d_bit_depth_minus1[ConvAtlasID][attrIdx]+1 or pin_attribute_2d_bit_depth_minus1[ConvAtlasID][attrIdx], if pin_attribute_present_flag[ConvAtlasID] equal to 1. ai_attribute_2d_bit_depth_minus1[j][i] plus 1 indicates the nominal 2D bit depth to which all the attribute videos with attribute index i, for the atlas with atlas ID j, shall be converted to. pin_attribute_2d_bit_depth_minus1[j][i] plus 1 indicates the nominal 2D bit depth to which the regions containing attribute with attribute index i, for the atlas with atlas ID j, shall be converted.pin_attribute_present_flag[j] equal to 0 indicates that packed video frames of the atlas with atlas ID j do not contain regions with attribute data. pin_attribute_present_flag[j] equal to 1 indicates that packed video frames of the atlas with atlas ID j do contain regions with attribute data. When pin_attribute_present_flag [j] is not present, its value is inferred to be equal to 0.

Where ConvAtlasID is set equal to vuh_atlas_id or determined through external means if the V3C unit header is unavailable. Vuh_atlas_id is signalled in V3C unit header for V3C_AD, V3C_OVD, V3C_GVD, V3C_AVD etc. vuh_atlas_id specifies the ID of the atlas that corresponds to the current V3C unit.

The nominal frame resolution for non-auxiliary video components is defined by the nominal width, VideoWidthNF, set equal to asps_frame_width, and the nominal height, VideoHeightNF, set equal to asps_frame_height. asps_frame_width indicates the atlas frame width in terms of integer number of samples, where a sample corresponds to a luma sample of a video component. It is a requirement of V3C bitstream conformance that the value of asps_frame_width shall be equal to the value of vps_frame_width [j], where j is the ID of the current atlas. asps_frame_height indicates the atlas frame height in terms of integer number of samples, where a sample corresponds to a luma sample of a video component. It is a requirement of V3C bitstream conformance that the value of asps_frame_height shall be equal to the value of vps_frame_height [j], where j is the ID of the current atlas. The nominal frame resolution for auxiliary video components is defined by the nominal width and height specified by the variables Aux Video WidthNF and Aux VideoHeightNF, respectively. Aux Video WidthNF and Aux VideoHeightNF are derived from the auxiliary video sub-bitstream associated with an atlas.

The nominal chroma format is defined to be 4:4:4.

The post-decoding-conversion section 30B consists of bit depth conversion, resolution conversion, output order conversion, atlas composition alignment, atlas dimension alignment, chroma upsampling, geometry map synthesis and attribute map synthesis. The video frames provided by the V3C decoding section 309 may require additional processing steps before being input to the reconstruction process. Such processing steps may include conversion of the decoded video frames to a nominal format (e.g. a nominal resolution, bit depth, chroma format, etc.). It is noted that information of nominal format is signalled in V3C VPS.

The pre-reconstruction section 310 receives the decoded atlas information, the decoded occupancy frames and decoded geometry frames and decoded attribute frames and may refine/modifie them. Specifically if occupancy synthesis flag, os_method_type [k] is equal to 1, which indicates the patch border filtering method, then occupancy synthesis is invoked with OccFramesNF [compTimeIdx] [0] and GeoFramesNF [0] [compTimeIdx] [0] as inputs and the modified array OccFramesNF [compTimeIdx] [0] as output. OccFramesNF indicates the decoded occupancy frames in the nominal format and GeoFramesNF indicates the decoded geometry frames at the nominal format.

The reconstruction section 311 reconstructs 3D data point cloud data or mesh data based on the nominal video frames derived in pre-reconstruction section 310, OccFramesNF [compTimeFrame][0][y][x],GeoFramesNF[mapIdx][compTimeFrame][0][y][x] and AttrFramesNF[attrIdx][compTimeFrame][0][y][x] as inputs. AttrFramesNF indicates the decoded attribute frames at the nominal format. The reconstruction section 311 derives a variable pointCnt as the number of points in the reconstructed point cloud frame, a ID array pointToPatch[pointCnt] as the patch index corresponding to each reconstructed point, a 2D array pointToPixel[pointCnt][dimIdx] as the atlas coordinates corresponding to each reconstructed point, a 2D array recPcGeo [pointCnt][dimIdx] as the list of coordinates corresponding to each reconstructed point, and, a 3D array recPcAttr [pointCnt][attrIdx][compIdx] as the attributes associated with the points in the reconstructed point cloud frame. Where pointCnt, dimIdx, attrIdx, compIdx correspond to the index of the reconstructed point, the attribute index, and the attribute dimension, respectively.

Specifically, the reconstruction section 311 derives recPcGeo and recPcAttr as follows.

```
M = 0
for(k=0; k<3; k++) {
   for(pointIdx=0; pointIdx<AtlasPatchRawPoints[pIdx]; pointIdx++) {
      y = AtlasPatch2dPosY[pIdx] + (m / AtlasPatch2dSizeX[pIdx])
      x = AtlasPatch2dPosX[pIdx] + (m % AtlasPatch2dSizeX[pIdx])
      rawPos1D[m] = gFrame[y][x]
      m++
   }
}
for(pointIdx=0; n<AtlasPatchRawPoints[pIdx]; n++) {
   recPcGeo[pointCnt][0] = rawPos1D[pointIdx] +
   AtlasPatch3dOffsetU[pIdx]
   recPcGeo[pointCnt][1] = rawPos1D[pointIdx +
   AtlasPatchRawPoints[pIdx]] +
AtlasPatch3dOffsetV[pIdx]
   recPcGeo[pointCnt][2] = rawPos1D[ pointIdx +
   2 * AtlasPatchRawPoints[pIdx]] +
AtlasPatch3dOffsetD[pIdx]
   y = AtlasPatch2dPosY[pIdx] + (pointIdx / AtlasPatch2dSizeX[pIdx])
   x = AtlasPatch2dPosX[pIdx] + (pointIdx % AtlasPatch2dSizeX[pIdx])
   for(attrIdx=0; attrIdx<ai_attribute_count[RecAtlasID]; attrIdx++) {
      attrDim = ai_attribute_dimension_minus1[RecAtlasID][attrIdx] + 1
      for(compIdx=0; compIdx<attrDim; compIdx++) {
         recPcAttr[pointCnt][attrIdx][compIdx] =
         aFrame[attrIdx][compIdx][y][x]
      }
   }
   if(ai_attribute_count[RecAtlasID]>0) {
      attrPresent[pointCnt] = 1
   }
   pointToPixel[pointCnt][0] = −1
   pointToPixel[pointCnt][1] = −1
   pointToPatch[pointCnt] = pIdx
   pointCnt++
}
``` where compTime is a target/composition time index. rawPos1D is one dimentional position gFrame, aFrame, and oFrame [y] [x] are the geometry frame, the attribute video frames and the occupancy frame in the nominal format respectively. TilePatch3dOffsetU is the associated tile patch parameters from the patch. ai_attribute_count[j] indicates the number of attributes associated with the atlas with atlas ID j. The rawPos1D is derived as follows.

```
M = 0
for(k=0; k<3; k++) {
   for(pointIdx=0; pointIdx<AtlasPatchRawPoints[pIdx]; pointIdx++) {
      y = AtlasPatch2dPosY[pIdx] + (m / AtlasPatch2dSizeX[pIdx])
      x = AtlasPatch2dPosX[pIdx] + (m % AtlasPatch2dSizeX[pIdx])
      rawPos1D[m] = gFrame[y][x]
      m++
   }
}
``` where AtlasPatchRawPoints, AtlasPatch2dPosX, AtlasPatch2dPosY, AtlasPatch2dSizeX and AtlasPatch2dSizeY are patch information derived from atlas information in atlas decoding section 302.

The arrays gFrame [mapIdx] [y] [x], aFrame [mapIdx] [attrIdx] [compIdx] [y] [x] are derived as follows:

```
for(j=0; j<asps_frame_height; j++) {
  for(i=0; i<asps_frame_width; i++) {
    oFrame[j][i] =
    occFramesNF[compTimeIdx][0][j][i]
    for(m=0; m<asps_map_count_minus1+1; m++) {
      gFrame[m][j][i] = geoFramesNF[m][compTimeIdx][0][j][i]
      for(a=0; a<ai_attribute_count[RecAtlasID]; a++) {
        for(c=0; c<ai_attribute_dimension_minus1[RecAtlasID][a]+1; c++) {
          aFrame[m][a][c][j][i] =
          attrFramesNF[a][m][compTimeIdx][c][j][i]
        }
      }
    }
  }
}
``` where ai_attribute_dimension_minus1 plus indicates the total number of dimensions (i.e., number of channels) of the attribute, which is signalled in V3C VPS and decoded by V3C unit decoding section 301.

The post-reconstruction section 312 refines3D data point cloud data or mesh data after the process of reconstruction section 311. The post-reconstruction section 312 receives pointCnt, as the number of reconstructed points for the current point cloud frame associated with the current atlas, a 1D array attrBitDepth [ ] as the nominal bit depth, oFrame [y] [x], recPcGeo, recPcAttr and outputs recPcGeo, possibly modified by application of geometry smoothing, and recPcAttr, possibly modified by the application of attribute smoothing.

Neural Network Post Filtering SEIs

The sub-bitstream decoding section 309 (the neural network post filter section 306) decodes a neural network post filter characterics (NNPFC) SEI and a neural network post filter activation (NNPFA) SEI.

FIG. 6 shows syntax table of the neural network post filter characterics SEI.

FIG. 7 shows syntax table of the neural network post filter activation SEI.

The SEIs (Supplemental Enhancement Information) are specified in ITU-T H.274| ISO/IEC 23002-7 and signalled in video bitsteams including occupancy video stream, geometry video stream and attribute video stream.

The NNPFC SEI specifies the neural network model information including its purpose (the process's function), the neural network parameters, input/output information and complexity etc. In NNPFC SEI, The neural network parameters is represented by the MPEG neural network coding (ISO/IEC 15938-17) and it can be signalled in the form of Uniform Resource Identifier (URI) or a bitstream payload in the SEI. The differential coding may be used in NNPFC using NNC's incremental update functionality where once the base network parameter is signalled by a NNPFC then neural network parameter is efficiently signalled referring to the base network parameter by the subsequent NNPFC SEIs. The NNPFC SEI has an identifiler nnpfc_id. NNPFC syntax element and filtering process is described below in neural-network post-filter characteristics SEI message semantics.

The NNPFA SEI specifies duration and which neural network model is applied where the corresponding NNPFC with nnpfc_id is equal to nnpfa_target_id, is activated. NNPFC syntax element and activation process is described below in neural-network post-filter activation SEI message semantics.

V3C neural network post filter information SEI

FIG. 8 shows syntax table of the V3C neural network post filter information SEI. When the sub-bitstream decoding section 309 (the neural network post filter section 306) applys the NNPC specified in VSEI, the sub-bitstream decoding section 309 needs to prepare neural network post filter process. The NNPFC SEI and the NNPFA SEI bitstream and the V3C unit are signalled in a different layer. Specifically since the NNPFC SEI and the NNPFA SEI is signalled in video sub-bitstream, or coded video stream (occupancy video stream, geometry video stream and attribute video stream) encoded in H.264/AVC, H.265/HEVC and H.266/VVC, the information needs to be decode by corresponding video codec. It means the 3D data decoding device 31 may not get the information directly. V3C neural network post filter information SEI (V3C NNPFI) is introduced to solve the problem. The V3C NNPFI SEI is signalled in the atlas layer or the atlas sub-bitstream (V3C_AD). V3C NNPFI SEI specifies which type of neural network post processing is used, the percistency of NNPF and which type of NNPF's process is used.

V3C Neural-Network Post-Filter Information SEI Message Semantics

The atlas decoding section 302 may decode and the atlas encoding section 102 may encode the following syntax elements.

nnpfi_type indicates which type (specification) is used for neural-network post-filter. nnpfi_type equal to 1 indicates the neural-network post-filter characteristics SEI and the neural-network post-filter activation in ISO/IEC 23002-7 (VSEI) is used.

nnpfi_cancel_flag equal to 1 indicates that the persistence of the neural-network post-processing filter is cancelled. The neural-network post-processing filter is utilized in either for occupancy video stream, geometry video stream or attribute video stream and is specified with ISO/IEC 23002-7 (VSEI).

nnpfi_cancel_flag equal to 0 indicates that the nnpfi_persistence_flag follows.

nnpfi_persistence_flag specifies the persistence of the target neural-network post-processing filter for the current layer. nnpfi_persistence_flag equal to 0 specifies that the target neural-network post-processing filter may be used for post-processing filtering for the current picture only.

Let aFrmA be the current atlas frame. nnpfi_persistence_flag equal to 1 specifies that the target neural-network post-processing filter may be used for post-processing filtering for the current picture and all subsequent pictures of the current layer in output order until any of the following conditions are true:

A new CAS begins.

The bitstream ends.

An atlas frame aFrmB in the current layer in a coded atlas access unit containing a NNPFA SEI message with the same nnpfa_target_id as the current SEI message and nnpfa_cancel_flag equal to 1 is output that follows the current picture in output order.

nnpfi_map_count_minus1 plus 1 indicates the number of map.

nnpfi_attribute_count specifies the number of attribute associated with the atlas.

nnpfi_occupancy_enabled_flag equal to 1 indicates the neural network post filter specified in ISO/IEC 23002-7 (VSEI) may be applied to the occupancy video stream.

nnpfi_occupancy_enabled_flag equal to 0 indicates the neural network post filter specified in ISO/IEC 23002-7 (VSEI) is not applied to the occupancy video stream.

nnpfi_occupancy_process_idc indicates the process/purpose of neural network post filter applied to the occupancy video stream. The value is specified in nnpfc_purpose specification in the neural-network post-filter characteristics SEI message semantics in ISO/IEC 23002-7 (VSEI).

nnpfi_geometry_enabled_flag[j] equal to 1 indicates the neural network post filter specified in ISO/IEC 23002-7 (VSEI) may be applied to the j-th map of geometry video stream.

nnpfi_geometry_enabled_flag[j] equal to 0 indicates the neural network post filter specified in ISO/IEC 23002-7 (VSEI) is not applied to the j-th map of geometry video stream.

nnpfi_geometry_process_idc[j] indicates the process/purpose of neural network post filter applied to the j-th map of geometry video stream. The value is specified in nnpfc_purpose specification in the neural-network post-filter characteristics SEI message semantics in ISO/IEC 23002-7 (VSEI).

nnpfi_attribute_enabled_flag[i][j] equal to 1 indicates the neural network post filter specified in ISO/IEC 23002-7 (VSEI) may be applied to the j-th map of i-th attribute video stream. nnpfi_attribute_enabled_flag[i][j] equal to 0 indicates the neural network post filter specified in ISO/IEC 23002-7 (VSEI) is not applied to the j-th map of i-th attribute video stream.

nnpfi_attribute_process_idc[i][j] indicates the process/purpose of neural network post filter applied to the j-th map of i-th attribute video stream. The value is specified in nnpfc_purpose specification in the neural-network post-filter characteristics SEI message semantics in ISO/IEC 23002-7 (VSEI).

Alternative V3C Neural-Network Post-Filter Information SEI Message Semantics

The atlas decoding section 302 may decode and the atlas encoding section 102 may encode the following alternative syntax elements.

nnpfi_occupancy_process_idc indicates the purpose of neural network post filter applied to the occupancy video stream. (nnpfi_occupancy_process_idc& 0x4)!=0 indicates that resolution resampling is used for occupancy video stream. (nnpfi_occupancy_process_idc & 0x10)!=0 indicates that bit depth upsampling is used for occupancy video stream.

nnpfi_geometry_process_idc[j] indicates the purpose of neural network post filter applied to the geometry video stream. (nnpfi_geometry_process_idc & 0x4)!=0 indicates that resolution resampling is used for geometry video stream. (nnpfi_geometry_process_idc[j] & 0x10)!=0 indicates that bit depth upsampling is used for geometry video stream.

nnpfi_attribute_process_idc[i][j] indicates the purpose of neural network post filter applied to the occupancy video stream. (nnpfi_attribute_process_idc[i][j] & 0x2)!=0 indicates that chroma upsampling is used for attribute video stream. (nnpfi_attribute_process_idc[i][j] & 0x4)!=0 indicates that resolution resampling is used for attribute video stream. (nnpfi_attribute_process_idc[i][j] & 0x10)!=0 indicates that bit depth upsampling is used for attribute video stream.

FIG. 9 also shows syntax table of the V3C neural network post filter information SEI.

In this case, the following syntax on the neural network model identification may be encoded by and the atlas encoding section 102 and decoded by the Atlas decoding section 302.

nnpfi_occupancy_model_idc indicates the ID value of the neural network model of neural network post filter applied to the occupancy video stream.

nnpfi_geometry_model_idc[j] indicates the ID value of the neural network model of neural network post filter applied to the j-th map of geometry video stream.

nnpfi_attribute_model_idc[i][j] indicates the ID value of neural network post filter applied to the j-th map of i-th attribute video stream.

The value of nnpfi_occupancy_model_idc, nnpfi_geometry_model_idc[j] and nnpfi_attribute_model_idc[i][j] shall be unique in the CAS for the same neural network model.

This unique value signalling and decoding for each occupancy and/or geometry and/or attribute provides the 3D data decoding device 31 to know which timing the neural network model should be reloaded in advance and how many the neural network should be stored in the 3D data decoding device 31.

Also, the following syntax on the neural network complexity information may be encoded by and the atlas encoding section 102 and decoded by the atlas decoding section 302.

nnpfi_occupancy_complexity_present_flag indicates whether the complexity information of neural network post filter applied to the occupancy video stream present or not.

nnpfi_geometry_complexity_present_flag[j] indicates whether the complexity information of neural network post filter applied to the j-th map of geometry video stream present or not.

nnpfi_attribute_complexity_present_flag[i][j] indicates whether the complexity information of neural network post filter applied to the j-th map of i-th attribute video stream present or not. nnpfi_complexity_info (kind, idx, mapIdx) may include the following syntax element.

nnpfc_parameter_type_idc equal to 0 indicates that the neural network uses only integer parameters. nnpfc_parameter_type_flag equal to 1 indicates that the neural network may use floating point or integer parameters. nnpfc_parameter_type_idc equal to 2 indicates that the neural network uses only binary parameters.

nnpfc_log2_parameter_bit_length_minus3 equal to 0, 1, 2, and 3 indicates that the neural network does not use parameters of bit length greater than 8, 16, 32, and 64, respectively.

nnpfc_num_parameters_idc indicates the maximum number of neural network parameters for the NNPF in units of a power of 2048. nnpfc_num_parameters_idc equal to 0 indicates that the maximum number of neural network parameters is unknown. The value nnpfc_num_parameters_idc shall be in the range of 0 to 52, inclusive.

If the value of nnpfc_num_parameters_idc is greater than zero, the variable maxNumParameters is derived as follows:

$$maxNumParameters = (2048 << nnpfc\_num\_parameters\_idc - 1) \quad (100)$$

nnpfc_num_kmac_operations_idc greater than 0 indicates that the maximum number of multiply-accumulate operations per sample of the NNPF is less than or equal to nnpfc_num_kmac_operations_idc*1000. nnpfc_num_kmac_operations_idc equal to 0 indicates that the maximum number of multiply-accumulate operations of the network is unknown.

nnpfc_total_kilobyte_size greater than 0 indicates a total size in kilobytes required to store the uncompressed parameters for the neural network. The total size in bits is a number equal to or greater than the sum of bits used to store each parameter. nnpfc_total_kilobyte_size is the total size in bits divided by 8 000, rounded up. nnpfc_total_kilobyte_size equal to 0 indicates that the total size required to store the parameters for the neural network is unknown.

This complexity signalling and decoding for each occupancy and/or geometry and/or attribute provides the 3D data decoding device 31 to know which neural network post filter can be processed in terms of its capability and decide which NNPF applys on which occupancy and/or geometry and/or attribute video stream.

Applying NNPC in V3C Specification

NNPFA and NNPFC is specified in VSEI specification. The following proecss and/or requirement is used to process NNPC in the 3D data decoding device 31.

The sub-bitstream decoding section 309 (the neural network post filter section 306) decodes and the sub-bitstream encoding section 109 encodes a neural network post filter characterics (NNPFC) SEI and a neural network post filter activation (NNPFA) SEI.

Bitdepth Conversion in NNPF Usage in V3C Specification

When the sub-bitstream decoding section 309 (the neural network post filter section 306) applies the neural-network post-filter specified in ISO/IEC 23002-7 (VSEI), output tensor shall be converted to the integer by using the functions OutY and OutC and a variable targetBitDepth.

FilteredYPic[i][xY][yY]=OutY(FilteredYPic[i][xY][yY])
FilteredCbPic[i][xY][yY]=OutC(FilteredCbPic[i][xY][yY])
FilteredCrPic[i][xY][yY]=OutC(FilteredCrPic[i][xY][yY])

where i, xX, yY is an index, an x coordinate and a y coordinate and the OutY and OutC is defined as below.

If the value of nnpfc_out_sample_idc syntax element in NNPFC SEI equal to 0, Functions OutY and OutC are specified as follows:

OutY(x)=Clip3(0, (1<<targetBitDepth)−1, Round(x*((1<<BitDepthY)−1)))
OutC(x)=Clip3(0, (1<<targetBitDepth)−1, Round(x*((1<<BitDepthC)−1)))

Otherwise (if nnpfc_out_sample_idc in NNPFC SEI equal to 1) indicates that the sample values output by the post-processing filter are unsigned integer. Functions OutY and OutC are specified as follows:

```
shift = outTensorBitDepth − targetBitDepth
if(outTensorBitDepth>=targetBitDepth)
    OutY(x) = Clip3(0, (1<< targetBitDepth)−1,
    (x + (1 << (shift−1))) >> shift)
else
    OutY(x) = x << (targetBitDepth − outTensorBitDepth)
shift = outTensorBitDepth − targetBitDepth
if(outTensorBitDepth>= targetBitDepth)
    OutC(x)= Clip3(0, (1 << targetBitDepth)−1,
    (x + (1 << (shift−1))) >> shift)
```

-continued

```
else
    OutC(x) = x << (targetBitDepth − outTensorBitDepth)
```

This bitdepth conversion guarantees the conformance in which the output of the 3D data decoding device 31 becomes the same between different 3D data decoding devices. Hereinafter, the conformance means the 3D data decoding device which conforms to the specification can decode the same 3D contents and produces the same output to fulfill interoperability.

Alternative Bitdepth Conversion in NNPF Usage in V3C Specification

When the sub-bitstream decoding section 309 (the neural network post filter section 306) applies the neural-network post-filter specified in ISO/IEC 23002-7 (VSEI) is applied, the value of output tensor (outputTensor) shall be converted to the integer by using the functions OutY and OutC and a variable targetBitDepth.

```
If(!nnpfc_component_last_flag) {
    FilteredYPic[i][xY][yY] = OutY(outputTensor[0][i][0][yP][xP])
    FilteredCbPic[i][xC][yC] = OutC(outputTensor[0][i][1][yPc][xPc])
    FilteredCrPic[i][xC][yC] = OutC(outputTensor[0][i][2][yPc][xPc])
} else {
    FilteredYPic[i][xY][yY] = OutY(outputTensor[0][i][yP][xP][0])
    FilteredCbPic[i][xC][yC] = OutC(outputTensor[0][i][yPc][xPc][1])
    FilteredCrPic[i][xC][yC] = OutC(outputTensor[0][i][yPc][xPc][2])
}
```

Alternative Bitdepth Conversion in NNPF Usage in V3C Specification

When the sub-bitstream decoding section 309 (the neural network post filter section 306) may apply the conversion after video decoding as follows.

In case of applying the NNPF on occupancy video stream, DecOccFrames[frameIdx][compIdx][y][x]=OutY(DecOccFrames[frameIdx][compIdx][y][x]).

In case of applying the NNPF on geometry video stream, DecGeoFrames[mapIdx][frameIdx][compIdx][y][x]= OutY(DecGeoFrames[mapIdx][frameIdx][compIdx][y][x]).

In case of applying the NNPF on attribute video stream, DecAttrFrames[attrIdx][partIdx][mapIdx][frameIdx][compIdx][y][x]= OutY(DecAttrFrames[attrIdx][partIdx][mapIdx][frameIdx][compIdx][y][x]).

bitdepth conversion configuration in NNPF usage in V3C specification

In an embodiment, the sub-bitstream decoding section 309 (the neural network post filter section 306) sets targetBitdepth to codec bitdepth denoted DecOccBitDepth, DecGeoBitDepth and DecAttrBitDepth. This embodiment achieves smaller complexity is required while it guarantees the conformance of the 3D data decoding device 31.

Alternative Bitdepth Conversion Configuration in NNPF Usage in V3C Specification In another embodiment, the sub-bitstream decoding section 309 (the neural network post filter section 306) sets the bitdepth of the nominal format denoted nominalBitDepth. The nominalBitDepth is signalled in V3C VPS for occupancy video stream, geometry video stream and attribute video steam.

In case of applying the NNPF on occupancy video stream, nominalBitdepth=oi_occupancy_2d_bit_depth_minus1[ConvAtlasID]+1.

In case of applying the NNPF on geometry video stream, nominalBitdepth=gi_geometry_2d_bit_depth_minus1[ConvAtlasID]+1.

In case of applying the neural network post filter on attribute video stream, nominalBitdepth=ai_attribute_2d_bit_depth_minus1[ConvAtlasID][attrIdx]+1.

Where ConvAtlasID is an atlas ID and attrIdx is an attribute index.

Alternatively the following assignment can be used.

In case of applying the NNPF on occupancy video stream, nominalBitdepth=asps_occupancy_2d_bit_depth_minus1+1.

In case of applying the neural network post filter on geometry video stream, nominalBitdepth=asps_geometry_2d_bit_depth_minus1+1.

In case of applying the neural network post filter on attribute video stream, nominalBitdepth=asps_attribute_2d_bit_depth_minus1+1.

Asps_geometry_2d_bit_depth_minus1 plus 1 indicates the bit depth of the geometry when projected onto 2D images. Asps_geometry_2d_bit_depth_minus1 shall be in the range of 0 to 31, inclusive. Asps_occupancy_2d_bit_depth_minus1 plus 1 indicates the bit depth of the occupancy when projected onto 2D images. Asps_attribute_2d_bit_depth_minus1 plus 1 indicates the bit depth of the attribute when projected onto 2D images.

NNPF Procedure in Occupancy Video Decoding

The occupancy decoding section 303 may apply NNPF specified in ISO/IEC 23002-7 (VSEI) on occupancy video stream. When the NNPF is applied, DecOccBitDepth, DecOccHeight, DecOccWidth, DecOccChromaFormat, DecOccChromaSamplingPosition, DecOccFullRange, DecOccColourPrimaries, DecOccTransferCharacteristics, DecOccMatrixCoeffs may not be those of codec picture but the those of output of the neural-network post-filter. DecOccChromaSamplingPosition, indicating, if present, the video chroma sampling position as specified in ISO/IEC 23091-2. DecOccFullRange, indicating, if present, the video full range code point as specified in ISO/IEC 23091-2. DecOccFullRange, indicating, if present, the video full range code point as specified in ISO/IEC 23091-2. DecOccColourPrimaries, indicating, if present, the chromaticity coordinates of the source primaries as specified in ISO/IEC 23091-2. DecOccTransferCharacteristics, indicating, if present, the transfer characteristics as specified in ISO/IEC 23091-2. DecOccMatrixCoeffs, indicating, if present, the matrix coefficients as specified in ISO/IEC 23091-2.

When the NNPF specified in ISO/IEC 23002-7 (VSEI) is applied, it is a requirement of bitstream conformance that the following constraints apply:

Only up to one neural-network post-filter is activated/applied to each frame of the occupancy video stream.

(nnpfc_purpose & 0x02) shall be 0 where chroma upsampling shall not be used.

(nnpfc_purpose & 0x08) shall be 0 where frame rate upsampling shall not be used.

(nnpfc_purpose & 0x20) shall be 0 where colourization shall not be used.

The followings may be applied.

nnpfc_padding_type shall be 0 only where zero padding only.

nnpfc_auxiliary_inp_idc shall be 0.

nnpfc_inp_order_idc shall be 0 where luma only post filter is allowed.

nnpfc_out_order_idc shall be 0, indicating luma only post filter is allowed.

nnpfc_inp_order_idc indicates the method of ordering the sample arrays of a cropped decoded output picture as one of the input pictures to the NNPF.

In another embodiment, the followings may be applied.

nnpfc_padding_type shall be 0, 1, 2, 4 only.

nnpfc_inp_order_idc shall be 0, 2, 3 only.

nnpfc_out_order_idc shall be 0, 2, 3 only.

In another embodiment, the followings may be applied.

nnpfc_constant_patch_size_flag shall be set equal to 1 where explicit patch size shall be specified in the NNPFC SEI.

nnpfc_auxiliary_inp_idc shall be 0 where a filtering strength control value strengthControlVal based on slice QP is not used.

In V3C specification and application, codec agnostic is important, and the above constraints is needed to guarantee the conformance.

In another embodiment, the followings may be applied.

When (nnpfc_purpose & 0x04)!=0, the output resolution of neural network post filter shall be equal to nominal resolution of the occupancy component, asps_frame_height×asps_frame_width.

When (nnpfc_purpose & 0x10)!=0, the output of neural network post filter shall be equal to nominal bit depth of the occupancy component, oi_occupancy_2d_bit_depth_minus1[ConvAtlasID]+1

When (nnpfc_purpose & 0x04)!=0, nnpfcOutputPicHeight shall be equal to asps_frame_height.

When (nnpfc_purpose & 0x04)!=0, nnpfcOutputPicWidth shall be equal asps_frame_width.

When (nnpfc_purpose & 0x10)!=0, nnpfc_output_format_idc shall be equal to 1, and (nnpfc_out_tensor_luma_bit-depth_minus8+8) shall be equal to oi_occupancy_2d_bit_depth_minus1[ConvAtlasID]+1.

NNPF Procedure in Geometry Video Decoding

The geometry decoding section 304 may apply NNPF specified in ISO/IEC 23002-7 (VSEI) on geometry video stream. When the NNPF is applied, DecGeoBitDepth, DecGeoHeight, DecGeoWidth, DecGeoChromaFormat, DecGeoChromaSamplingPosition, DecGeoFullRange, DecGeoColourPrimaries, DecGeoTransferCharacteristics, DecGeoMatrixCoeffs may not be those of codec picture but the those of output of the neural-network post-filter. DecGeoChromaSamplingPosition, indicating, if present, the geometry chroma sampling as specified in ISO/IEC 23091-2. DecGeoFullRange, indicating, if present, the video full range code point as specified in ISO/IEC 23091-2. DecGeoColourPrimaries, indicating, if present, the chromaticity coordinates of the source primaries as specified in ISO/IEC 23091-2. DecGeoTransferCharacteristics, indicating, if present, the transfer characteristics as specified in ISO/IEC 23091-2. DecGeoMatrixCoeffs, indicating, if present, the matrix coefficients as specified in ISO/IEC 23091-2.

When the NNPF specified in ISO/IEC 23002-7 (VSEI) is applied, it is a requirement of bitstream conformance that the following constraints apply:

Only up to one neural-network post-filter is activated/applied to each frame of the geometry video stream.

(nnpfc_purpose & 0x02) shall be 0 where chroma upsampling shall not be used.

(nnpfc_purpose & 0x08) shall be 0 where frame rate upsampling shall not be used.

(nnpfc_purpose & 0x20) shall be 0 where colourization shall not be used.

The following may be applied.

nnpfc_padding_type shall be 0 only where zero padding only.

nnpfc_auxiliary_inp_idc shall be 0.

nnpfc_inp_order_idc shall be 0 where luma only post filter is allowed.

nnpfc_out_order_idc shall be 0, indicating luma only post filter is allowed.

In another embodiment, the following may be applied.

nnpfc_padding_type shall be 0, 1, 2, 4 only.

nnpfc_inp_order_idc shall be 0, 2, 3 only.

nnpfc_out_order_idc shall be 0, 2, 3 only.

In another embodiment, the following may be applied.

nnpfc_constant_patch_size_flag shall be set equal to 1.

nnpfc_auxiliary_inp_idc shall be 0.

In another embodiment, the following may be applied.

When (nnpfc_purpose & 0x04)!=0, the output resolution of neural network post filter shall be equal to nominal resolution for the geometry component, asps_frame_height× asps_frame_width. Specifically, when (nnpfc_purpose & 0x04)!=0, nnpfcOutputPicHeight shall be equal to asps_frame_height and nnpfcOutputPicWidth shall be equal asps_frame_width.

When (nnpfc_purpose & 0x10)!=0, the output of neural network post filter shall be equal to nominal bit depth of the occupancy component, gi_geometry_2d_bit_depth_minus1[ConvAtlasID]+1.

NNPF Procedure in Attribute Video Decoding

The attribute decoding section 305 may apply NNPF specified in ISO/IEC 23002-7 (VSEI) on attribute video stream. When the NNPF is applied, DecAttrBitDepth, DecAttrHeight, DecAttrWidth, DecAttrChromaFormat, DecAttrChromaSamplingPosition, DecAttrFullRange, DecAttrColourPrimaries, DecAttrTransferCharacteristics, DecAttrMatrixCoeffs may not be those of codec picture but the those of output of the neural-network post-filter. DecAttrChromaSamplingPosition, indicating, if present, the attribute chroma sampling as specified in ISO/IEC 23091-2. DecAttrFullRange, indicating, if present, the video full range code point as specified in ISO/IEC 23091-2. DecAttrColourPrimaries, indicating, if present, the chromaticity coordinates of the source primaries as specified in ISO/IEC 23091-2. DecAttrTransferCharacteristics, indicating, if present, the transfer characteristics as specified in ISO/IEC 23091-2. DecAttrMatrixCoeffs, indicating, if present, the matrix coefficients as specified in ISO/IEC 23091-2.

When the NNPF specified in ISO/IEC 23002-7 (VSEI) is applied, it is a requirement of bitstream conformance that the following constraints apply:

Only up to one neural-network post-filter is activated/applied to each frame of the geometry video stream.

(nnpfc_purpose & 0x08) shall be 0 where frame rate upsampling shall not be used.

(nnpfc_purpose & 0x20) shall be 0 where colourization shall not be used.

nnpfc_auxiliary_inp_idc shall be 0.

In another embodiment, the following may be applied.

nnpfc_padding_type shall be 0, 1, 2, 4 only.

In another embodiment, the following may be applied.

nnpfc_constant_patch_size_flag shall be set equal to 1.

nnpfc_auxiliary_inp_idc shall be 0.

In another embodiment, the following may be applied.

When (nnpfc_purpose & 0x02)!=0, the output chroma format of neural network post filter shall be equal to nominal chroma format of the attribute component of 4:4:4.

When (nnpfc_purpose & 0x04)!=0, the output resolution of neural network post filter shall be equal to nominal resolution of the attribute component, asps_frame_height× asps_frame_width. Specifically, when (nnpfc_purpose & 0x04)!=0, nnpfcOutputPicHeight shall be equal to asps_frame_height and nnpfcOutputPicWidth shall be equal asps_frame_width.

When (nnpfc_purpose & 0x10)!=0, the output of neural network post filter shall be equal to nominal bit depth of the occupancy component, ai_attribute_2d_bit_depth_minus1[ConvAtlasID][attrIdx]+1.

Procedure to Apply NNPF when Codec is HEVC

The sub-bitstream decoding section 309 (atlas decoding section 302, occupancy decoding section 303, geometry decoding section 304, attribute decoding section 305) may apply the following procedure to apply NNPF specified in ITU-T H.274| ISO/IEC 23002-7 on the occupancy and/or geometry and/or attribute video sub-bitstream in the case the codec for for the corresponding video sub-bitstream is HEVC. The sub-bitstream decoding section 309 may derive a codec to decode oi_occupancy_codec_id, gi_geometry_codec_id, or ai_attribute_codec_id in VPS for occupancy, geometry, attribute video stream respectively.

Let currCodedPic be the coded picture for which the neural-network post-processing filter (NNPF) defined by the neural-network post-filter characteristics (NNPFC) SEI message is activated by a neural-network post-filter activation (NNPFA) SEI message.

The variable pictureRateUpsamplingFlag is set equal to (nnpfc_purpose & 0x08)!=0.

The variable numInputPics is set equal to nnpfc_num_input_pics_minus1+1. The array inputPicPoc [I] for all values of i in the range of 0 to numInputPics−1, inclusive, specifying the picture order count values of the input pictures for the NNPF, is derived as follows:

inputPicPoc[0] is set equal to PicOrderCntVal of currCodedPic.

When numInputPics is greater than 1, the following applies for each value of i in the range of 1 to numInputPics−1, inclusive, in increasing order of i:

If currCodedPic is associated with a frame packing arrangement SEI message with fp_arrangement_type equal to 5 and a particular value of fp_current_frame_is_frame0_flag, inputPicPoc[i] is set equal to PicOrderCntVal of the picture that precedes, in output order, the picture associated with index i−1 and is associated with a frame packing arrangement SEI message with fp_arrangement_type equal to 5 and the same value of fp_current_frame_is_frame0_flag.

Otherwise (currCodedPic is not associated with a frame packing arrangement SEI message with fp_arrangement_type equal to 5), inputPicPoc[i] is set equal to PicOrderCntVal of the picture that precedes, in output order, the picture associated with index i−1.

For purposes of interpretation of the NNPFC SEI message, the following variables are specified:

If pictureRateUpsamplingFlag is equal to 1 and there is a second NNPF that is defined by at least one NNPFC SEI message, is activated by an NNPFA SEI message for currCodedPic, and has resolutionResamplingFlag equal to 1, the following applies:

CroppedWidth is set equal to nnpfcOutputPicWidth defined for the second NNPF.

CroppedHeight is set equal to nnpfcOutputPicHeight defined for the second NNPF.

Otherwise, the following applies:

CroppedWidth is set equal to the value of pic_width_in_luma_samples−SubWidthC*(conf_win_left_offset+conf_win_right_offset) for currCodedPic.

CroppedHeight is set equal to the value of pic_height_in_luma_samples−SubHeightC*(conf_win_top_offset+conf_win_bottom_offset) for currCodedPic.

The luma sample arrays CroppedYPic[i] and the chroma sample arrays CroppedCbPic[i] and CroppedCrPic[i], when present, are derived as follows for each value of i in the range of 0 to numInputPics−1, inclusive:

Let sourcePic be the cropped decoded output picture that has PicOrderCntVal equal to inputPicPoc[i] in the CLVS containing currCodedPic.

If pictureRateUpsamplingFlag is equal to 0, the following applies:

The luma sample array CroppedYPic[i] and the chroma sample arrays CroppedCbPic[i] and CroppedCrPic[i], when present, are set to be the 2-dimensional arrays of decoded sample values of the Y, Cb and Cr components, respectively, of sourcePic.

Otherwise (pictureRateUpsamplingFlag is equal to 1), the following applies:

The variable sourceWidth is set equal to the value of pic_width_in_luma_samples−SubWidthC*(conf_win_left_offset+conf_win_right_offset) for sourcePic.

The variable sourceHeight is set equal to the value of pic_height_in_luma_samples−SubHeightC*(conf_win_top_offset+conf_win_bottom_offset) for sourcePic.

If source Width is equal to CroppedWidth and sourceHeight is equal to CroppedHeight, inputPic is set to be the same as sourcePic.

Otherwise (source Width is not equal to CroppedWidth or sourceHeight is not equal to CroppedHeight), the following applies:

There shall be an NNPF, hereafter referred to as the resolution resampling NNPF, that is defined by at least one NNPFC SEI message, is activated by an NNPFA SEI message for sourcePic, and has resolutionResamplingFlag equal to 1, nnpfc_pic_width_in_luma_samples equal to CroppedWidth and nnpfc_pic_height_in_luma_samples equal to CroppedHeight.

inputPic is set to be the output of the neural-network inference of the super resolution NNPF with sourcePic being an input.

The luma sample array CroppedYPic[i] and the chroma sample arrays CroppedCbPic[i] and CroppedCrPic[i], when present, are set to be the 2-dimensional arrays of decoded sample values of the Y, Cb and Cr components, respectively, of inputPic.

BitDepthY and BitDepthC are set equal to BitDepthY and BitDepthC.

ChromaFormatIdc is set equal to chroma_format_idc.

StrengthControlVal is set equal to the value of (SliceQpY+QpBdOffsetY)÷(51+QpBdOffsetY) of the first slice of currCodedPic.

Where BitDepthY and QpBdOffsetY is derived using the value of sps_bitdepth_minus8 and sps_bitdepth_minus8 syntax element in the sub-bitstream as follows.

$$BitDepth = 8 + sps\_bitdepth\_luma\_minus8$$

QpBdOffsetY=6*sps_bitdepth_luma_minus8

In this embodiment, the 3D decoding apparatus 31 decodes a slice QP SliceQPY and a offset QpBdOffsetY and derives StrengthControlVal is set equal to the value of (SliceQpY+QpBdOffsetY)=(51+QpBdOffsetY) of the first slice of current coded picture and set StrengthControlVal to a input tensor and apply the neural network post filter on the sub-bitstream in the case codec of the sub-bitstream is HEVC.

Procedure to Apply NNPF when Codec is VVC

The sub-bitstream decoding section 309 (atlas decoding section 302, occupancy decoding section 303, geometry decoding section 304, attribute decoding section 305) may apply the following procedure to apply NNPF specified in ITU-T H.274| ISO/IEC 23002-7 on the occupancy and/or geometry and/or attribute video sub-bitstream in the case codec for the corresponding video sub-bitstream is VVC.

Let currCodedPic be the coded picture for which the neural-network post-processing filter (NNPF) defined by the neural-network post-filter characteristics (NNPFC) SEI message is activated by a neural-network post-filter activation (NNPFA) SEI message.

The variable pictureRateUpsamplingFlag is set equal to (nnpfc_purpose & 0x08)!=0.

The variable numInputPics is set equal to nnpfc_num_input_pics_minus1+1.

The array inputPicPoc[i] for all values of i in the range of 0 to numInputPics−1, inclusive, specifying the picture order count values of the input pictures for the NNPF, is derived as follows:

inputPicPoc[0] is set equal to PicOrderCntVal of currCodedPic.

When numInputPics is greater than 1, the following applies for each value of i in the range of 1 to numInputPics−1, inclusive, in increasing order of i:

If currCodedPic is associated with a frame packing arrangement SEI message with fp_arrangement_type equal to 5 and a particular value of fp_current_frame_is_frame0_flag, inputPicPoc[i] is set equal to PicOrderCntVal of the picture that precedes, in output order, the picture associated with index i−1 and is associated with a frame packing arrangement SEI message with fp_arrangement_type equal to 5 and the same value of fp_current_frame_is_frame0_flag.

Otherwise (currCodedPic is not associated with a frame packing arrangement SEI message with fp_arrangement_type equal to 5), inputPicPoc[i] is set equal to PicOrderCntVal of the picture that precedes, in output order, the picture associated with index i−1.

For purposes of interpretation of the NNPFC SEI message, the following variables are specified:

If pictureRateUpsamplingFlag is equal to 1 and there is a second NNPF that is defined by at least one NNPFC SEI message, is activated by an NNPFA SEI message for currCodedPic, and has resolutionResamplingFlag equal to 1, the following applies:

CroppedWidth is set equal to nnpfcOutputPicWidth defined for the second NNPF.

CroppedHeight is set equal to nnpfcOutputPicHeight defined for the second NNPF.

Otherwise, the following applies:

CroppedWidth is set equal to the value of pps_pic_width_in_luma_samples−SubWidthC*(pps_conf_win_left_offset+pps_conf_win_right_offset) for currCodedPic.

CroppedHeight is set equal to the value of pps_pic_height_in_luma_samples−SubHeightC*(pps_conf_win_top_offset+pps_conf_win_bottom_offset) for currCodedPic.

The luma sample arrays CroppedYPic[i] and the chroma sample arrays CroppedCbPic[i] and CroppedCrPic[i], when present, are derived as follows for each value of i in the range of 0 to numInputPics-1, inclusive:

Let sourcePic be the cropped decoded output picture that has PicOrderCntVal equal to inputPicPoc[i] in the CLVS containing currCodedPic.

If pictureRateUpsamplingFlag is equal to 0, the following applies:

The luma sample array CroppedYPic[i] and the chroma sample arrays CroppedCbPic[i] and CroppedCrPic[i], when present, are set to be the 2-dimensional arrays of decoded sample values of the Y, Cb and Cr components, respectively, of sourcePic.

Otherwise (pictureRateUpsamplingFlag is equal to 1), the following applies:

The variable sourceWidth is set equal to the value of pps_pic_width_in_luma_samples−SubWidthC*(pps_conf_win_left_offset+pps_conf_win_right_offset) for sourcePic.

The variable sourceHeight is set equal to the value of pps_pic_height_in_luma_samples−SubHeightC*(pps_conf_win_top_offset+pps_conf_win_bottom_offset) for sourcePic.

If source Width is equal to CroppedWidth and sourceHeight is equal to CroppedHeight, inputPic is set to be the same as sourcePic.

Otherwise (source Width is not equal to CroppedWidth or sourceHeight is not equal to CroppedHeight), the following applies:

There shall be an NNPF, hereafter referred to as the resolution resampling NNPF, that is defined by at least one NNPFC SEI message, is activated by an NNPFA SEI message for sourcePic, and has resolutionResamplingFlag equal to 1, nnpfc_pic_width_in_luma_samples equal to CroppedWidth and nnpfc_pic_height_in_luma_samples equal to CroppedHeight.

inputPic is set to be the output of the neural-network inference of the super resolution NNPF with sourcePic being an input.

The luma sample array CroppedYPic[i] and the chroma sample arrays CroppedCbPic[i] and CroppedCrPic[i], when present, are set to be the 2-dimensional arrays of decoded sample values of the Y, Cb and Cr components, respectively, of inputPic.

BitDepthY and BitDepthC are both set equal to BitDepth.

ChromaFormatIdc is set equal to sps_chroma_format_idc.

StrengthControlVal is set equal to the value of (SliceQpY+QpBdOffset)÷(63+QpBdOffset) of the first slice of currCodedPic.

Where BitDepth and QpBdOffset is derived using the value of sps_bitdepth_minus8 and sps_bitdepth_minus8 syntax element in the sub-bitstream as follows.

$$BitDepth = 8 + sps\_bitdepth\_minus8$$

QpBdOffset=6*sps_bitdepth_minus8

Neural-network post-filter characterics SEI message semantics nnpfc_purpose indicates the purpose of the NNPF as specified in as follows, where (nnpfc_purpose & bitMask) not equal to 0 indicates that the NNPF has the purpose associated with the bitMask value. When nnpfc_purpose is greater than 0 and (nnpfc_purpose & bitMask) is equal to 0, the purpose associated with the bitMask value is not applicable to the NNPF. When nnpfc_pupose is equal to 0, the NNPF may be used as determined by the application.

| bitMask | Interpretation |
|---|---|
| 0x01 | General visual quality improvement |
| 0x02 | Chroma upsampling (from the 4:2:0 chroma format to the 4:2:2 or 4:4:4 chroma format, or from the 4:2:2 chroma format to the 4:4:4 chroma format) |
| 0x04 | Resolution resampling (increasing or decreasing the width or height) |
| 0x08 | Picture rate upsampling |
| 0x10 | Bit depth upsampling (increasing the luma bit depth or the chroma bit depth) |
| 0x20 | Colourization |

The variables chromaUpsamplingFlag, resolutionResamplingFlag, pictureRateUpsamplingFlag, bitDepthUpsamplingFlag, and colourizationFlag, specifying whether nnpfc_purpose indicates the purpose of the NNPF to include chroma upsampling, resolution upsampling, picture rate upsampling, bit depth upsampling, and colourization, respectively, are derived as follows:

$$chromaUpsamplingFlag = ((nnpfc\_purpose \& 0x02) > 0)?1:0$$

$$resolutionResamplingFlag = ((nnpfc\_purpose \& 0x04) > 0)?1:0$$

$$pictureRateUpsamplingFlag = ((nnpfc\_purpose \& 0x08) > 0)?1:0$$

$$bitDepthUpsamplingFlag = ((nnpfc\_purpose \& 0x10) > 0)?1:0$$

$$colourizationFlag = ((nnpfc\_purpose \& 0x20) > 0)?1:0$$

When an NNPFC SEI message is the first NNPFC SEI message, in decoding order, that has a particular nnpfc_id value within the current CLVS, the following applies:

This SEI message specifies a base NNPF.

This SEI message pertains to the current decoded picture and all subsequent decoded pictures of the current layer, in output order, until the end of the current CLVS.

nnpfc_mode_idc equal to 0 indicates that this SEI message contains an ISO/IEC 15938-17 bitstream that specifies a base NNPF or is an update relative to the base NNPF with the same nnpfc_id value.

When an NNPFC SEI message is the first NNPFC SEI message, in decoding order, that has a particular nnpfc_id value within the current CLVS, nnpfc_mode_idc equal to 1 specifies that the base NNPF associated with the nnpfc_id value is a neural network identified by the URI indicated by nnpfc_uri with the format identified by the tag URI nnpfc_tag_uri.

When an NNPFC SEI message is neither the first NNPFC SEI message, in decoding order, nor a repetition of the first NNPFC SEI message, in decoding order, that has a particular nnpfc_id value within the current CLVS, nnpfc_mode_idc equal to 1 specifies that an update relative to the base NNPF with the same nnpfc_id value is defined by the URI indicated by nnpfc_uri with the format identified by the tag URI nnpfc_tag_uri.

When this SEI message is the first NNPFC SEI message, in decoding order, that has a particular nnpfc_id value within the current CLVS, the NNPF PostProcessingFilter( ) is assigned to be the same as the base NNPF.

When this SEI message is neither the first NNPFC SEI message, in decoding order, nor a repetition of the first NNPFC SEI message, in decoding order, that has a particular nnpfc_id value within the current CLVS, an NNPF PostProcessingFilter( ) is obtained by applying the update defined by this SEI message to the base NNPF.

Updates are not cumulative but rather each update is applied on the base NNPF, which is the NNPF specified by the first NNPFC SEI message, in decoding order, that has a particular nnpfc_id value within the current CLVS.

nnpfc_reserved_zero_bit_a shall be equal to 0 in bitstreams conforming to this edition of this document. Decoders shall ignore NNPFC SEI messages in which nnpfc_reserved_zero_bit_a is not equal to 0.

nnpfc_tag_uri contains a tag URI with syntax and semantics as specified in IETF RFC 4151 identifying the format and associated information about the neural network used as a base NNPF or an update relative to the base NNPF with the same nnpfc_id value specified by nnpfc_uri.

nnpfc_uri contains a URI with syntax and semantics as specified in IETF Internet Standard 66 identifying the neural network used as a base NNPF or an update relative to the base NNPF with the same nnpfc_id value.

nnpfc_property_present_flag equal to 1 specifies that syntax elements related to the filter purpose, input formatting, output formatting, and complexity are present.

nnpfc_property_present_flag equal to 0 specifies that no syntax elements related to the filter purpose, input formatting, output formatting, and complexity are present.

nnpfc_base_flag equal to 1 specifies that the SEI message specifies the base NNPF.

nnpf_base_flag equal to 0 specifies that the SEI message specifies an update relative to the base NNPF. When not present, the value of nnpfc_base_flag is inferred to be equal to 0.

nnpfc_num_input_pics_minus1 plus 1 specifies the number of pictures used as input for the NNPF. The value of nnpfc_num_input_pics_minus1 shall be in the range of 0 to 63, inclusive. The variable numInputPics, specifying the number of pictures used as input for the NNPF, is derived as numInputPics=nnpfc_num_input_pics_minus1+1 nnpfc_out_sub_c_flag specifies the values of the variables outSubWidthC and outSubHeightC when chromaUpsamplingFlag is equal to 1. nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1.

nnpfc_out_colour_format_idc, when colourizationFlag is equal to 1, specifies the colour format of the NNPF output and consequently the values of the variables outSubWidthC and outSubHeightC. nnpfc_out_colour_format_idc equal to 1 specifies that the colour format of the NNPF output is the 4:2:0 format and outSubWidthC and outSubHeightC are both equal to 2. nnpfc_out_colour_format_idc equal to 2 specifies that the colour format of the NNPF output is the 4:2:2 format and outSubWidthC is equal to 2 and outSubHeightC is equal to 1. nnpfc_out_colour_format_idc equal to 3 specifies that the colour format of the NNPF output is the 4:4:4 format and outSubWidthC and outSubHeightC are both equal to 1.

When chromaUpsamplingFlag and colourizationFlag are both equal to 0, outSubWidthC and outSubHeightC are inferred to be equal to SubWidthC and SubHeightC, respectively.

nnpfc_pic_width_num_minus1 plus 1 and nnpfc_pic_width_denom_minus1 plus 1 specify the numerator and denominator, respectively, for the resampling ratio of the NNPF output picture width relative to CroppedWidth. The value of (nnpfc_pic_width_num_minus1+1)÷(nnpfc_pic_width_denom_minus1+1) shall be in the range of 1÷16 to 16, inclusive. When nnpfc_pic_width_num_minus1 and nnpfc_pic_width_denom_minus1 are not present, the values of nnpfc_pic_width_num_minus1 and nnpfc_pic_width_denom_minus1 are both inferred to be equal to 0.

The variable nnpfcOutputPicWidth, representing the width of the luma sample arrays of the picture(s) resulting from applying the NNPF identified by nnpfc_id to the input picture(s), is derived as follows:

nnpfcOutputPicWidth=Ceil (CroppedWidth* (nnpfc_pic_width_num_minus1+1)÷ (nnpfc_pic_width_denom_minus1+1)) nnpfc_pic_height_num_minus1 plus 1 and nnpfc_pic_height_denom_minus1 plus 1 specify the numerator and denominator, respectively, for the resampling ratio of the NNPF output picture height relative to CroppedHeight. The value of (nnpfc_pic_height_num_minus1+1)÷(nnpfc_pic_height_denom_minus1+1) shall be in the range of 1÷16 to 16, inclusive. When nnpfc_pic_height_num_minus1 and nnpfc_pic_height_denom_minus1 are not present, the values of nnpfc_pic_height_num_minus1 and nnpfc_pic_height_denom_minus1 are both inferred to be equal to 0.

The variable nnpfcOutputPicHeight, representing the height of the luma sample arrays of the picture(s) resulting from applying the NNPF identified by nnpfc_id to the input picture(s), is derived as follows:

nnpfcOutputPicHeight=Ceil (CroppedHeight* (nnpfc_pic_height_num_minus1+1)÷(nnpfc_pic_height_denom_minus1+1))

nnpfc_interpolated_pics[i] specifies the number of interpolated pictures generated by the NNPF between the i-th and the (i+1)-th picture used as input for the NNPF.

The variables NumInpPicsInOutputTensor, specifying the number of pictures that have a corresponding input picture and are present in the output tensor of the NNPF, InpIdx[idx] specifying the input picture index of the idx-th picture that is present in the output tensor of the NNPF and has a corresponding input picture, and numOutputPics, specifying the total number of pictures present in the output tensor of the NNPF, are derived as follows:

```
for( i = 0, numOutputPics = 0; i < numInputPics; i++ )
    if( nnpfc_input_pic_output_flag[ i ] ) {
        InpIdx[ numOutputPics ] = i
        numOutputPics++
    }
NumInpPicsInOutputTensor = numOutputPics
if( pictureRateUpsamplingFlag )
    for( i = 0; i <= numInputPics − 2; i++ )
        numOutputPics += nnpfc_interpolated_pics[ i ]
``` nnpfc_component_last_flag equal to 1 indicates that the last dimension in the input tensor inputTensor to the NNPF and the output tensor outputTensor resulting from the NNPF is used for a current channel. Nnpfc_component_last_flag equal to 0 indicates that the third dimension in the input tensor inputTensor to the NNPF and the output tensor outputTensor resulting from the NNPF is used for a current channel.

nnpfc_inp_format_idc indicates the method of converting a sample value of the cropped decoded output picture to an input value to the NNPF. When nnpfc_inp_format_idc is equal to 0, the input values to the NNPF are real numbers and the functions InpY( ) and InpC( ) are specified as follows:

$$InpY(x) = x \div ((1 << BitDepthY) - 1)$$

$$InpC(x) = x \div ((1 << BitDepthC) - 1)$$

When nnpfc_inp_format_idc is equal to 1, the input values to the NNPF are unsigned integer numbers and the functions InpY( ) and InpC( ) are specified as follows:

```
shiftY = BitDepth Y − inpTensorBitDepthY
if(inpTensorBitDepthY>=BitDepthY)
   InpY(x) = x << (inpTensorBitDepthY − BitDepthY)
else
   InpY(x) = Clip3(0, (1<<inpTensorBitDepthY)−1,
     (x + (1 << (shiftY−1))) >> shiftY)
shiftC = BitDepthC − inpTensorBitDepthC
if(inpTensorBitDepthC>=BitDepthC)
   InpC(x) = x << (inpTensorBitDepthC − BitDepthC)
else
   InpC(x) = Clip3(0, (1<<inpTensorBitDepthC)−1,
     (x + (1<<(shiftC − 1))) >> shiftC)
```

The variable inpTensorBitDepthY is derived from the syntax element nnpfc_inp_tensor_luma_bitdepth_minus8 as specified below. The variable inpTensorBitDepthC is derived from the syntax element nnpfc_inp_tensor_chroma_bitdepth_minus8 as specified below.

nnpfc_inp_tensor_luma_bitdepth_minus8 plus 8 specifies the bit depth of luma sample values in the input integer tensor. The value of inpTensorBitDepthY is derived as follows:
inpTensorBitDepthY=nnpfc_inp_tensor_luma_bitdepth_minus8+8 nnpfc_inp_tensor_chroma_bitdepth_minus8 plus 8 specifies the bit depth of chroma sample values in the input integer tensor. The value of inpTensorBitDepthC is derived as follows:
inpTensorBitDepthC=nnpfc_inp_tensor_chroma_bitdepth_minus8+8

Description of nnpfc_inp_order_idc Values

| nnpfc_inp_order_idc | Description |
| --- | --- |
| 0 | If nnpfc_auxiliary_inp_idc is equal to 0, one luma matrix is present in the input tensor for each input picture, and the number of channels is 1. Otherwise when nnpfc_auxiliary_inp_idc is equal to 1, one luma matrix and one auxiliary input matrix are present, and the number of channels is 2. |
| 1 | If nnpfc_auxiliary_inp_idc is equal to 0, two chroma matrices are present in the input tensor, and the number of channels is 2. Otherwise when nnpfc_auxiliary_inp_idc is equal to 1, two chroma matrices and one auxiliary input matrix are present, and the number of channels is 3. |
| 2 | If nnpfc_auxiliary_inp_idc is equal to 0, one luma and two chroma matrices are present in the input tensor, and the number of channels is 3. Otherwise when nnpfc_auxiliary_inp_idc is equal to 1, one luma matrix, two chroma matrices and one auxiliary input matrix are present, and the number of channels is 4. |
| 3 | If nnpfc_auxiliary_inp_idc is equal to 0, four luma matrices and two chroma matrices are present in the input tensor, and the number of channels is 6. Otherwise when nnpfc_auxiliary_inp_idc is equal to 1, four luma matrices, two chroma matrices, and one auxiliary input matrix are present in the input tensor, and the number of channels is 7. The luma channels are derived in an interleaved manner. This nnpfc_inp_order_idc can only be used when the input chroma format is 4:2:0. |
| 4 . . . 255 | Reserved |

A patch is a rectangular array of samples from a component (e.g., a luma or chroma component) of a picture.

nnpfc_auxiliary_inp_idc greater than 0 indicates that auxiliary input data is present in the input tensor of the NNPF. Nnpfc_auxiliary_inp_idc equal to 0 indicates that auxiliary input data is not present in the input tensor. Nnpfc_auxiliary_inp_idc equal to 1 specifies that auxiliary input data is derived as specified in Formula NNPF.

When nnpfc_auxiliary_inp_idc is equal to 1, the variable strengthControlScaledVal is derived as follows:

```
if(nnpfc_inp_format_idc==1)
   strengthControlScaledVal = Floor(StrengthControlVal *
     ((1<<inpTensorBitDepthY)−1))
else
   strengthControlScaledVal = StrengthControlVal
```

The process DeriveInputTensors( ) for deriving the input tensor inputTensor for a given vertical sample coordinate cTop and a horizontal sample coordinate cLeft specifying the top-left sample location for the patch of samples included in the input tensor, is specified as follows:

```
for(i=0; i<numInputPics; i++) {
  if(nnpfc_inp_order_idc==0)
    for(yP= −nnpfc_overlap; yP<inpPatchHeight+nnpfc_overlap; yP++)
      for(xP= −nnpfc_overlap; xP<inpPatchWidth+nnpfc_overlap; xP++) {
        inpVal = InpY(InpSampleVal(cTop+yP, cLeft+xP, CroppedHeight,
          CroppedWidth, CroppedYPic[i]))
        yPovlp = yP + nnpfc_overlap
        xPovlp = xP + nnpfc_overlap
        if(!nnpfc_component_last_flag)
          inputTensor[0][i][0][yPovlp][xPovlp] = inpVal
        else
          inputTensor[0][i][yPovlp][xPovlp][0] = inpVal
        if(nnpfc_auxiliary_inp_idc==1)
          if(!nnpfc_component_last_flag)
            inputTensor[0][i][1][yPovlp][xPovlp] = strengthControlScaledVal
```

```
            else
                inputTensor[0][i][yPovlp][xPovlp][1] = strengthControlScaledVal
        }
    else if(nnpfc_inp_order_idc==1) (Formula NNPF)
        for(yP= -nnpfc_overlap; yP<inpPatchHeight+nnpfc_overlap; yP++)
            for(xP= -nnpfc_overlap; xP<inpPatchWidth+nnpfc_overlap; xP++) {
                inpCbVal = InpC(InpSampleVal(cTop+yP, cLeft+xP, CroppedHeight / SubHeightC,
                    CroppedWidth / SubWidthC, CroppedCbPic[i]))
                inpCrVal = InpC(InpSampleVal(cTop+yP, cLeft+xP, CroppedHeight / SubHeightC,
                    CroppedWidth / SubWidthC, CroppedCrPic[i]))
                yPovlp = yP + nnpfc_overlap
                xPovlp = xP + nnpfc_overlap
                if(!nnpfc_component_last_flag) {
                    inputTensor[0][i][0][yPovlp][xPovlp] = inpCbVal
                    inputTensor[0][i][1][yPovlp][xPovlp] = inpCrVal
                } else {
                    inputTensor[0][i][yPovlp][xPovlp][0] = inpCbVal
                    inputTensor[0][i][yPovlp][xPovlp][1] = inpCrVal
                }
                if(nnpfc_auxiliary_inp_idc==1)
                    if(!nnpfc_component_last_flag)
                        inputTensor[0][i][2][yPovlp][xPovlp] = strengthControlScaledVal
                    else
                        inputTensor[0][i][yPovlp][xPovlp][2] = strengthControlScaledVal
            }
    else if(nnpfc_inp_order_idc==2)
        for(yP= -nnpfc_overlap; yP<inpPatchHeight+nnpfc_overlap; yP++)
            for(xP= -nnpfc_overlap; xP<inpPatchWidth+nnpfc_overlap; xP++) {
                yY = cTop + yP
                xY = cLeft + xP
                yC = yY / SubHeightC
                xC = xY / SubWidthC
                inpYVal = InpY(InpSampleVal(yY, xY, CroppedHeight,
                    CroppedWidth, CroppedYPic[i]))
                inpCbVal = InpC(InpSampleVal(yC, xC, CroppedHeight / SubHeightC,
                    CroppedWidth / SubWidthC, CroppedCbPic[i]))
                inpCrVal = InpC(InpSampleVal(yC, xC, CroppedHeight / SubHeightC,
                    CroppedWidth / SubWidthC, CroppedCrPic[i]))
                yPovlp = yP + nnpfc_overlap
                xPovlp = xP + nnpfc_overlap
                if(!nnpfc_component_last_flag) {
                    inputTensor[0][i][0][yPovlp][xPovlp] = inpYVal
                    inputTensor[0][i][1][yPovlp][xPovlp] = inpCbVal
                    inputTensor[0][i][2][yPovlp][xPovlp] = inpCrVal
                } else {
                    inputTensor[0][i][yPovlp][xPovlp][0] = inpYVal
                    inputTensor[0][i][yPovlp][xPovlp][1] = inpCbVal
                    inputTensor[0][i][yPovlp][xPovlp][2] = inpCrVal
                }
                if(nnpfc_auxiliary_inp_idc==1)
                    if(!nnpfc_component_last_flag)
                        inputTensor[0][i][3][yPovlp][xPovlp] = strengthControlScaledVal
                    else
                        inputTensor[0][i][yPovlp][xPovlp][3] = strengthControlScaledVal
            }
    else if(nnpfc_inp_order_idc==3)
        for(yP= -nnpfc_overlap; yP<inpPatchHeight+nnpfc_overlap; yP++)
            for(xP= -nnpfc_overlap; xP<inpPatchWidth+nnpfc_overlap; xP++) {
                yTL = cTop + yP * 2
                xTL = cLeft + xP * 2
                yBR = yTL + 1
                xBR = xTL + 1
                yC = cTop / 2 + yP
                xC = cLeft / 2 + xP
                inpTLVal = InpY(InpSampleVal(yTL, xTL, CroppedHeight,
                    CroppedWidth, CroppedYPic[i]))
                inpTRVal = InpY(InpSampleVal(yTL, xBR, CroppedHeight,
                    CroppedWidth, CroppedYPic[i]))
                inpBLVal = InpY(InpSampleVal(yBR, xTL, CroppedHeight,
                    CroppedWidth, CroppedYPic[i]))
                inpBRVal = InpY(InpSampleVal(yBR, xBR, CroppedHeight,
                    CroppedWidth, CroppedYPic[i]))
                inpCbVal = InpC(InpSampleVal(yC, xC, CroppedHeight / 2,
                    CroppedWidth / 2, CroppedCbPic[i]))
                inpCrVal = InpC(InpSampleVal(yC, xC, CroppedHeight / 2,
                    CroppedWidth / 2, CroppedCrPic[i]))
                yPovlp = yP + nnpfc_overlap
                xPovlp = xP + nnpfc_overlap
                if(!nnpfc_component_last_flag) {
```

```
    inputTensor[0][i][0][yPovlp][xPovlp] = inpTLVal
    inputTensor[0][i][1][yPovlp][xPovlp] = inpTRVal
    inputTensor[0][i][2][yPovlp][xPovlp] = inpBLVal
    inputTensor[0][i][3][yPovlp][xPovlp] = inpBRVal
    inputTensor[0][i][4][yPovlp][xPovlp] = inpCbVal
    inputTensor[0][i][5][yPovlp][xPovlp] = inpCrVal
  } else {
    inputTensor[0][i][yPovlp][xPovlp][0] = inpTLVal
    inputTensor[0][i][yPovlp][xPovlp][1] = inpTRVal
    inputTensor[0][i][yPovlp][xPovlp][2] = inpBLVal
    inputTensor[0][i][yPovlp][xPovlp][3] = inpBRVal
    inputTensor[0][i][yPovlp][xPovlp][4] = inpCbVal
    inputTensor[0][i][yPovlp][xPovlp][5] = inpCrVal
  }
  if(nnpfc_auxiliary_inp_idc==1)
    if(!nnpfc_component_last_flag)
      inputTensor[0][i][6][yPovlp][xPovlp] = strengthControlScaledVal
    else
      inputTensor[0][i][yPovlp][xPovlp][6] = strengthControlScaledVal
  }
}
``` nnpfc_separate_colour_description_present_flag equal to 1 indicates that a distinct combination of colour primaries, transfer characteristics, and matrix coefficients for the picture resulting from the NNPF is specified in the SEI message syntax structure.

nnpfc_separate_colour_description_present_flag equal to 0 indicates that the combination of colour primaries, transfer characteristics, and matrix coefficients for the picture resulting from the NNPF is the same as indicated in VUI parameters for the CLVS.

nnpfc_colour_primaries specifies the colour primaries of the picture resulting from applying the NNPF specified in the SEI message, rather than the colour primaries used for the CLVS.

nnpfc_transfer_characteristics specifies the transfer characteristics of the picture resulting from applying the NNPF specified in the SEI message, rather than the transfer characteristics used for the CLVS.

nnpfc_matrix_coeffs specifies the matrix coefficients of the picture resulting from applying the NNPF specified in the SEI message, rather than the matrix coefficients used for the CLVS.

nnpfc_out_format_idc equal to 0 indicates that the sample values output by the NNPF are real numbers where the value range of 0 to 1, inclusive, maps linearly to the unsigned integer value range of 0 to $(1<<bitDepth)-1$, inclusive, for any desired bit depth bitDepth for subsequent post-processing or displaying.

nnpfc_out_format_idc equal to 1 indicates that the luma sample values output by the NNPF are unsigned integer numbers in the range of 0 to $(1<<(nnpfc\_out\_tensor\_luma\_bitdepth\_minus8+8))-1$, inclusive, and the chroma sample values output by the NNPF are unsigned integer numbers in the range of 0 to $(1<<(nnpfc\_out\_tensor\_chroma\_bitdepth\_minus8+8))-1$, inclusive.

nnpfc_out_tensor_luma_bitdepth_minus8 plus 8 specifies the bit depth of luma sample values in the output integer tensor.

nnpfc_out_tensor_chroma_bitdepth_minus8 plus 8 specifies the bit depth of chroma sample values in the output integer tensor.

nnpfc_out_order_idc indicates the output order of samples resulting from the NNPF.

Description of nnpfc_out_order_idc Values

| nnpfc_out_order_idc | Description |
| --- | --- |
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the output chroma format is 4:2:0. |
| 4 . . . 255 | Reserved |

The process StoreOutputTensors( ) for deriving sample values in the filtered output sample arrays FilteredYPic, FilteredCbPic, and FilteredCrPic from the output tensor outputTensor for a given vertical sample coordinate cTop and a horizontal sample coordinate cLeft specifying the top-left sample location for the patch of samples included in the input tensor, is specified as follows:

```
for(i=0; i<numOutputPics; i++) {
  if(nnpfc_out_order_idc==0)
    for(yP=0; yP<outPatchHeight; yP++)
      for(xP=0; xP<outPatchWidth; xP++) {
        yY = cTop * outPatchHeight / inpPatchHeight + yP
        xY = cLeft * outPatchWidth / inpPatchWidth + xP
        if (yY<nnpfcOutputPicHeight && xY<nnpfcOutputPicWidth) {
          if(!nnpfc_component_last_flag)
            FilteredYPic[i][xY][yY] = outputTensor[0][i][0][yP][xP]
          else
            FilteredYPic[i][xY][yY] = outputTensor[0][i][yP][xP][0]
        }
}
```

```
else if(nnpfc_out_order_idc==1)
    for(yP=0; yP<outPatchCHeight; yP++)
        for(xP=0; xP<outPatchCWidth; xP++) {
            xSrc = cLeft * horCScaling + xP
            ySrc = cTop * verCScaling + yP
            if (ySrc<nnpfcOutputPicHeight / outSubHeightC &&
                    xSrc<nnpfcOutputPicWidth / outSubWidthC) {
                if(!nnpfc_component_last_flag) {
                    FilteredCbPic[i][xSrc][ySrc] = outputTensor[0][i][0][yP][xP]
                    FilteredCrPic[i][xSrc][ySrc] = outputTensor[0][i][1][yP][xP]
                } else {
                    FilteredCbPic[i][xSrc][ySrc] = outputTensor[0][i][yP][xP][0]
                    FilteredCrPic[i][xSrc][ySrc] = outputTensor[0][i][yP][xP][1]
                }
            }
        }
else if(nnpfc_out_order_idc==2)
    for(yP=0; yP<outPatchHeight; yP++)
        for(xP=0; xP<outPatchWidth; xP++) {
            yY = cTop * outPatchHeight / inpPatchHeight + yP
            xY = cLeft * outPatchWidth / inpPatchWidth + xP
            yC = yY / outSubHeightC
            xC = xY / outSubWidthC
            yPc = (yP / outSubHeightC) * outSubHeightC
            xPc = (xP / outSubWidthC) * outSubWidthC
            if (yY<nnpfcOutputPicHeight && xY<nnpfcOutputPicWidth) {
                if(!nnpfc_component_last_flag) {
                    FilteredYPic[i][xY][yY] = outputTensor[0][i][0][yP][xP]
                    FilteredCbPic[i][xC][yC] = outputTensor[0][i][1][yPc][xPc]
                    FilteredCrPic[i][xC][yC] = outputTensor[0][i][2][yPc][xPc]
                } else {
                    FilteredYPic[i][xY][yY] = outputTensor[0][i][yP][xP][0]
                    FilteredCbPic[i][xC][yC] = outputTensor[0][i][yPc][xPc][1]
                    FilteredCrPic[i][xC][yC] = outputTensor[0][i][yPc][xPc][2]
                }
            }
        }
else if(nnpfc_out_order_idc==3)
    for(yP=0; yP<outPatchHeight; yP++)
        for(xP=0; xP<outPatchWidth; xP++) {
            ySrc = cTop / 2 * outPatchHeight / inpPatchHeight + yP
            xSrc = cLeft / 2 * outPatchWidth / inpPatchWidth + xP
            if (ySrc<nnpfcOutputPicHeight/2 && xSrc<nnpfcOutputPicWidth/2) {
                if(!nnpfc_component_last_flag) {
                    FilteredYPic[i][xSrc*2][ySrc*2]     = outputTensor[0][i][0][yP][xP]
                    FilteredYPic[i][xSrc*2+1][ySrc*2]   = outputTensor[0][i][1][yP][xP]
                    FilteredYPic[i][xSrc*2][ySrc*2+1]   = outputTensor[0][i][2][yP][xP]
                    FilteredYPic[i][xSrc*2+1][ySrc*2+1] = outputTensor[0][i][3][yP][xP]
                    FilteredCbPic[i][xSrc][ySrc]        = outputTensor[0][i][4][yP][xP]
                    FilteredCrPic[i][xSrc][ySrc]        = outputTensor[0][i][5][yP][xP]
                } else {
                    FilteredYPic[i][xSrc*2][ySrc*2]     = outputTensor[0][i][yP][xP][0]
                    FilteredYPic[i][xSrc*2+1][ySrc*2]   = outputTensor[0][i][yP][xP][1]
                    FilteredYPic[i][xSrc*2][ySrc*2+1]   = outputTensor[0][i][yP][xP][2]
                    FilteredYPic[i][xSrc*2+1][ySrc*2+1] = outputTensor[0][i][yP][xP][3]
                    FilteredCbPic[i][xSrc][ySrc]        = outputTensor[0][i][yP][xP][4]
                    FilteredCrPic[i][xSrc][ySrc]        = outputTensor[0][i][yP][xP][5]
                }
            }
        }
}
``` nnpfc_overlap indicates the overlapping horizontal and vertical sample counts of adjacent input tensors of the NNPF.

nnpfc_constant_patch_size_flag equal to 1 indicates that the NNPF accepts exactly the patch size indicated by nnpfc_patch_width_minus1 and nnpfc_patch_height_minus1 as input.

nnpfc_constant_patch_size_flag equal to 0 indicates that the NNPF accepts as input any patch size with width inpPatchWidth and height inpPatchHeight such that the width of an extended patch (i.e., a patch plus the overlapping area), which is equal to inpPatchWidth+2*nnpfc_overlap, is a positive integer multiple of nnpfc_extended_patch_width_cd_delta_minus1+1+2*nnpfc_overlap, and the height of the extended patch, which is equal to inpPatchHeight+2*nnpfc_overlap, is a positive integer multiple of nnpfc_extended_patch_height_cd_delta_minus1+1+2*nnpfc_overlap.

nnpfc_patch_width_minus1 plus 1, when nnpfc_constant_patch_size_flag equal to 1, indicates the horizontal sample counts of the patch size required for the input to the NNPF.

nnpfc_patch_height_minus1 plus 1, when nnpfc_constant_patch_size_flag equal to 1, indicates the vertical sample counts of the patch size required for the input to the NNPF.

nnpfc_extended_patch_width_cd_delta_minus1 plus 1 plus 2*nnpfc_overlap, when nnpfc_constant_patch_size_flag equal to 0, indicates a common divisor of all allowed values of the width of an extended patch required for the input to the NNPF.

nnpfc_extended_patch_height_cd_delta_minus1 plus 1 plus 2*nnpfc_overlap, when nnpfc_constant_ patch_size_flag equal to 0, indicates a common divisor of all allowed values of the height of an extended patch required for the input to the NNPF.

Let the variables inpPatchWidth and inpPatchHeight be the patch size width and the patch size height, respectively.

If nnpfc_constant_patch_size_flag is equal to 0, the following applies:

The values of inpPatchWidth and inpPatchHeight are either provided by external means not specified in this document or set by the post-processor itself.

Otherwise (nnpfc_constant_patch_size_flag is equal to 1), the value of inpPatchWidth is set equal to nnpfc_patch_width_minus1+1 and the value of inpPatchHeight is set equal to nnpfc_patch_height_minus1+1.

The variables outPatchWidth, outPatchHeight, horCScaling, verCScaling, outPatchCWidth, and outPatchCHeight are derived as follows:

outPatchWidth=(nnpfcOutputPicWidth*inpPatchWidth)/Cropped Width outPatchHeight=(nnpfcOutputPicHeight*inpPatchHeight)/CroppedHeight horCScaling=SubWidthC/outSubWidthC verCScaling=SubHeightC/outSubHeightC outPatchCWidth=outPatchWidth*horCScaling outPatchCHeight=outPatchHeight*verCScaling nnpfc_padding_type indicates the process of padding when referencing sample locations outside the boundaries of the cropped decoded output picture.

Informative Description of nnpfc_padding_type Values

| nnpfc_padding_type | Description |
| --- | --- |
| 0 | zero padding |
| 1 | replication padding |
| 2 | reflection padding |
| 3 | wrap-around padding |
| 4 | fixed padding |
| 5 . . . 15 | Reserved | nnpfc_luma_padding_val indicates the luma value to be used for padding when nnpfc_padding_type is equal to 4.

nnpfc_cb_padding_val indicates the Cb value to be used for padding when nnpfc_padding_type is equal to 4.

nnpfc_cr_padding_val indicates the Cr value to be used for padding when nnpfc_padding_type is equal to 4.

The function InpSampleVal(y, x, picHeight, picWidth, croppedPic) with inputs being a vertical sample location y, a horizontal sample location x, a picture height picHeight, a picture width picWidth, and sample array croppedPic returns the value of sampleVal derived as follows:

```
if(nnpfc_padding_type==0)
    if(y<0 || x<0 || y>=picHeight || x>=picWidth)
        sampleVal = 0
    else
        sampleVal = croppedPic[x][y]
else if(nnpfc_padding_type==1)
    sampleVal = croppedPic[Clip3(0, picWidth-1, x)][Clip3(0, picHeight-1, y)]
else if(nnpfc_padding_type==2)
    sampleVal = croppedPic[Reflect(picWidth-1, x)][Reflect(picHeight-1, y)]
else if(nnpfc_padding_type==3)
    if(y>=0 && y<picHeight)
        sampleVal = croppedPic[Wrap(picWidth-1, x)][y]
else if(nnpfc_padding_type==4)
    if(y<0 || x<0 || y>=picHeight || x>=picWidth)
        sampleVal[0] = nnpfc_luma_padding_val
        sampleVal[1] = nnpfc_cb_padding_val
        sampleVal[2] = nnpfc_cr_padding_val
    else
        sampleVal = croppedPic[x][y]
```

The following example process may be used, with the NNPF PostProcessingFilter( ) to generate. in a patch-wise manner. the filtered and/or interpolated picture(s), which contain Y. Cb, and Cr sample arrays FilteredYPic, FilteredCbPic, and FilteredCrPic, respectively, as indicated by nnpfc_out_order_idc:

```
if(nnpfc_inp_order_idc==0 || nnpfc_inp_order_idc==2)
    for(cTop=0; cTop<CroppedHeight; cTop+=inpPatchHeight)
        for(cLeft=0; cLeft<CroppedWidth; cLeft+=inpPatchWidth) {
            DeriveInputTensors( )
            outputTensor = PostProcessingFilter(inputTensor)
            StoreOutputTensors( )
        }
else if(nnpfc_inp_order_idc==1)
    for(cTop=0; cTop<CroppedHeight / SubHeightC;
    cTop+=inpPatchHeight)
        for(cLeft=0; cLeft<CroppedWidth / SubWidthC;
        cLeft+=inpPatchWidth) {
            DeriveInputTensors( )
            outputTensor = PostProcessingFilter(inputTensor)
            StoreOutputTensors( )
        }
else if(nnpfc_inp_order_idc==3)
    for(cTop=0; cTop<CroppedHeight; cTop+=inpPatchHeight*2)
        for(cLeft=0; cLeft<CroppedWidth; cLeft+=inpPatchWidth*2) {
            DeriveInputTensors( )
            outputTensor = PostProcessingFilter(inputTensor)
            StoreOutputTensors( )
        }
```

The order of the pictures in the stored output tensor is in output order, and the output order generated by applying the NNPF in output order is interpreted to be in output order (and not conflicting with the output order of the input pictures).

nnpfc_complexity_info_present_flag equal to 1 specifies that one or more syntax elements that indicate the complexity of the NNPF associated with the nnpfc_id are present.

nnpfc_complexity_info_present_flag equal to 0 specifies that no syntax elements that indicates the complexity of the NNPF associated with the nnpfc_id are present.

nnpfc_parameter_type_idc equal to 0 indicates that the neural network uses only integer parameters. nnpfc_parameter_type_flag equal to 1 indicates that the neural network may use floating point or integer parameters. Nnpfc_parameter_type_idc equal to 2 indicates that the neural network uses only binary parameters.

nnpfc_log2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log2_parameter_bit_length_minus3 is not present the neural network does not use parameters of bit length greater than 1.

nnpfc_num_parameters_idc indicates the maximum number of neural network parameters for the NNPF in units of a power of 2048. nnpfc_num_parameters_idc equal to 0 indicates that the maximum number of neural network parameters is unknown.

If the value of nnpfc_num_parameters_idc is greater than zero, the variable maxNumParameters is derived as follows:

$$maxNumParameters = (2048 << \text{nnpfc\_num\_parameters\_idc}) - 1$$

nnpfc_num_kmac_operations_idc greater than 0 indicates that the maximum number of multiply-accumulate operations per sample of the NNPF is less than or equal to nnpfc_num_kmac_operations_idc*1000. Nnpfc_num_kmac_operations_idc equal to 0 indicates that the maximum number of multiply-accumulate operations of the network is unknown.

nnpfc_total_kilobyte_size greater than 0 indicates a total size in kilobytes required to store the uncompressed parameters for the neural network. The total size in bits is a number equal to or greater than the sum of bits used to store each parameter. Nnpfc_total_kilobyte_size is the total size in bits divided by 8000, rounded up. Nnpfc_total_kilobyte_size equal to 0 indicates that the total size required to store the parameters for the neural network is unknown.

nnpfc_reserved_zero_bit_b shall be equal to 0 in bitstreams conforming to this edition of this document. Decoders shall ignore NNPFC SEI messages in which nnpfc_reserved_zero_bit_b is not equal to 0.

nnpfc_payload_byte[i] contains the i-th byte of a bitstream conforming to ISO/IEC 15938-17. The byte sequence nnpfc_payload_byte[i] for all present values of i shall be a complete bitstream that conforms to ISO/IEC 15938-17.

Neural-Network Post-Filter Activation SEI Message Semantics

The neural-network post-filter activation (NNPFA) SEI message activates or de-activates the possible use of the target neural-network post-processing filter (NNPF), identified by nnpfa_target_id, for post-processing filtering of a set of pictures. For a particular picture for which the NNPF is activated, the target NNPF is the NNPF specified by the last NNPFC SEI message with nnpfc_id equal to nnpfa_target_id, that precedes the first VCL NAL unit of the current picture in decoding order that is not a repetition of the NNPFC SEI message that contains the base NNPF.

nnpfa_target_id indicates the target NNPF, which is specified by one or more NNPFC SEI messages that pertain to the current picture and have nnpfc_id equal to nnpfa_target_id.

nnpfa_cancel_flag equal to 1 indicates that the persistence of the target NNPF established by any previous NNPFA SEI message with the same nnpfa_target_id as the current SEI message is cancelled, i.e., the target NNPF is no longer used unless it is activated by another NNPFA SEI message with the same nnpfa_target_id as the current SEI message and nnpfa_cancel_flag equal to 0. nnpfa_cancel_flag equal to 0 indicates that the nnpfa_persistence_flag follows.

nnpfa_persistence_flag specifies the persistence of the target NNPF for the current layer.

nnpfa_persistence_flag equal to 0 specifies that the target NNPF may be used for post-processing filtering for the current picture only.

nnpfa_persistence_flag equal to 1 specifies that the target NNPF may be used for post-processing filtering for the current picture and all subsequent pictures of the current layer in output order until one or more of the following conditions are true:

A new CLVS of the current layer begins.

The bitstream ends.

A picture in the current layer associated with a NNPFA SEI message with the same nnpfa_target_id as the current SEI message and nnpfa_cancel_flag equal to 1 is output that follows the current picture in output order.

Let the nnpfcTargetPictures be the set of pictures to which the last NNPFC SEI message with nnpfc_id equal to nnpfa_target_id that precedes the current NNPFA SEI message in decoding order pertains. Let nnpfaTargetPictures be the set of pictures for which the target NNPF is activated by the current NNPFA SEI message.

In one example, a 3D video decoding apparatus configured to decode atlas and geometry video stream, occupancy video stream and attribute video stream to derive geometry frames, occupancy frames and attribute frames and reconstruct the 3D information based on geometry frames, occupancy frames and attribute frames comprising the 3D video decoding apparatus configured to decode the neural network post filter characteristics (NNPFC) SEI and the neural network post filter activation (NNPFA) SEI and the 3D decoding applies the neural network post filter on the geometry video stream, the occupancy video stream or the attribute video stream.

In one example, the 3D video decoding apparatus further comprising at least the purpose of the NNPFC is restricted for the geometry video stream, the occupancy video stream or the attribute.

In one example, the 3D video decoding apparatus further comprising the output tensor or output frames are converted to the integer value when applying the neural network post filter on the geometry video stream, the occupancy video stream or the attribute video stream.

In one example, the 3D video decoding apparatus further comprising the target bit depth of the integer value is the bit depth of the corresponding coded video.

In one example, the 3D video decoding apparatus further comprising the target bit depth of the integer value is the bit depth of the corresponding nominal format.

In one example, the 3D video decoding apparatus further comprising the 3D decoding apparatus decodes a V3C neural network post filter information (V3C NNPFI) SEI which is signalled in atlas information (V3C_AD) and the V3C NNPFI indicates at least which type of neural network is used or which process is used in the NNPFC SEI.

In one example, the 3D video decoding apparatus further comprising the 3D decoding apparatus decodes a slice QP SliceQPY and a offset QpBdOffsetY and derives StrengthControlVal is set equal to the value of (SliceQpY+QpBdOffsetY)÷(51+QpBdOffsetY) of the first slice of current coded picture and set StrengthControlVal to a input tensor and apply the neural network post filter on the sub-bitstream in the case codec of the sub-bitstream is HEVC.

In one example, a 3D video encoding apparatus configured to encode atlas frames and geometry frames, occupancy maps and attribute frames to derive atlas and geometry video stream, occupancy video stream and attribute video stream and create 3D information based on geometry frames, occupancy maps and attribute frames comprising the 3D encoding apparatus configured to encode the neural network post filter characteristics (NNPFC) SEI and the neural network post filter activation (NNPFA) SEI and the 3D video encoding applies the neural network post filter on the geometry frames, the occupancy maps or the attribute frames.

The invention claimed is:

1. A device comprising one or more processors configured to:
derive variables BitDepthY and BitDepthC equal to BitDepthY and BitDepthC;
decode a slice QP SliceQPY and an offset QpBdOffsetY;
derive StrengthControlVal equal to a value of (SliceQpY+QpBdOffsetY)÷(51+QpBdOffsetY) of a first slice of current coded picture; and
set StrengthControlVal to an input tensor.

2. The device of claim 1, wherein the processors further configured to:
parse a first syntax element in a neural network post-filter characteristics (NNPFC) supplemental enhancement information (SEI) message, wherein the first syntax element indicates a purpose of a neural-network post-processing filter (NNPF);
if pictureRateUpsamplingFlag is equal to 1, there is a second NNPF that is defined by at least one NNPFC SEI message, and an nnpfc_purpose indicates that resolution resample flag is equal to 1,
set a variable CroppedWidth equal to nnpfcOutputPicWidth defined for the second NNPF, and
set a variable CroppedHeight equal to nnpfcOutputPicHeight defined for the second NNPF; and
otherwise,
set a variable CroppedWidth equal to a value of pic_width_in_luma_samples−SubWidthC*(conf_win_left_offset+conf_win_right_offset) for currPic, and
set a variable CroppedHeight equal to a value of pic_height_in_luma_samples−SubHeightC*(conf_win_top_offset+conf_win_bottom_offset) for currPic.

3. A device comprising one or more processors configured to:
encode BitDepthY and BitDepthC;
derive variables BitDepthY and BitDepthC equal to the BitDepthY and the BitDepthC;
encode a slice QP SliceQPY and an offset QpBdOffsetY;
derive StrengthControlVal equal to a value of (SliceQpY+QpBdOffsetY)÷(51+QpBdOffsetY) of a first slice of current coded picture; and
set StrengthControlVal to an input tensor.

* * * * *